(12) United States Patent
Lee et al.

(10) Patent No.: US 12,367,827 B2
(45) Date of Patent: Jul. 22, 2025

(54) DISPLAY DEVICE AND METHOD FOR DRIVING THE SAME

(71) Applicant: SAMSUNG DISPLAY CO., LTD., Yongin-si (KR)

(72) Inventors: Hyundae Lee, Yongin-si (KR); Kangbin Jo, Yongin-si (KR); Jungwoo Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/360,025

(22) Filed: Jul. 27, 2023

(65) Prior Publication Data

US 2024/0127753 A1 Apr. 18, 2024

(30) Foreign Application Priority Data

Oct. 17, 2022 (KR) .................. 10-2022-0133530

(51) Int. Cl.
*G09G 3/3233* (2016.01)
*G06F 21/32* (2013.01)
*G06K 19/07* (2006.01)
*G06V 40/13* (2022.01)
*G06V 40/16* (2022.01)
*G06V 40/19* (2022.01)
*G09G 3/20* (2006.01)
*G09G 3/30* (2006.01)
*G09G 3/32* (2016.01)
(Continued)

(52) U.S. Cl.
CPC ............ *G09G 3/3233* (2013.01); *G09G 3/30* (2013.01); *H10K 59/131* (2023.02); *H10K 59/40* (2023.02); *H10K 59/60* (2023.02); *H10K 59/65* (2023.02); *G06F 21/32* (2013.01); *G09G 2300/0819* (2013.01); *G09G 2300/0842* (2013.01); *G09G 2310/08* (2013.01); *G09G 2330/021* (2013.01); *G09G 2354/00* (2013.01); *G09G 2360/14* (2013.01)

(58) Field of Classification Search
None
See application file for complete search history.

(56) References Cited

U.S. PATENT DOCUMENTS 11,790,690 B1 * 10/2023 Chung ............... G06V 40/1318
382/124
11,842,560 B1 * 12/2023 Chang ................ G06V 40/1318
(Continued)

*Primary Examiner* — Patrick N Edouard
*Assistant Examiner* — Peijie Shen
(74) *Attorney, Agent, or Firm* — F. CHAU & ASSOCIATES, LLC

(57) ABSTRACT

A display device includes a display panel, a sensor controller, and a driving controller. The display panel includes a plurality of pixels, each of which includes a light emitter to emit light to display an image and a plurality of sensors. Each of the sensors includes a light detector to detect user information. The sensor controller is electrically connected with the sensors and is configured to provide a reset control signal to the plurality of sensors. The driving controller determines a first time point initiating when a user is able to attempt to input the user information, determines a second time point when the user information is actually input, and provides the sensor controller with an enable signal to activate the reset control signal after the first time point and deactivate the reset control signal after the second time point.

17 Claims, 14 Drawing Sheets

(51) Int. Cl.
   *G09G 3/3208*   (2016.01)
   *G09G 3/3266*   (2016.01)
   *H10K 59/131*   (2023.01)
   *H10K 59/40*    (2023.01)
   *H10K 59/60*    (2023.01)
   *H10K 59/65*    (2023.01)

(56) References Cited

U.S. PATENT DOCUMENTS

| | | | |
|---|---|---|---|
| 2019/0279566 A1* | 9/2019 | Wang | G09G 3/3233 |
| 2021/0073504 A1* | 3/2021 | Shih | G09G 3/20 |
| 2021/0109639 A1* | 4/2021 | Hsieh | G06F 3/0412 |
| 2023/0049300 A1* | 2/2023 | Katsuta | H10F 39/802 |
| 2023/0075463 A1* | 3/2023 | Lee | G09G 3/3233 |
| 2024/0000389 A1* | 1/2024 | Kim | A61B 5/7475 |
| 2024/0420634 A1* | 12/2024 | No | G09G 3/3275 |

* cited by examiner

DISPLAY DEVICE AND METHOD FOR DRIVING THE SAME

CROSS-REFERENCE TO RELATED APPLICATIONS

This application claims priority under 35 U.S.C. § 119 to Korean Patent Application No. 10-2022-0133530, filed on Oct. 17, 2022, in the Korean Intellectual Property Office, the disclosure of which is incorporated by reference herein in its entirety.

BACKGROUND

1. Technical Field

Embodiments described herein relate to a display device and a method for driving a display device.

2. Related Art

Display devices are in widespread use. These devices communicate information to users, for example, through the display of images. Display devices also receive information through detection of user inputs. More recent display devices detect additional types of information, including but not limited to biometric information.

A variety of schemes have been developed for recognizing user information. One example is a capacitive scheme which detects user information based on changes in capacitance between electrodes of the display. Another example is an optical scheme which detects user information by detecting incident light using an optical sensor. Another example is an ultrasonic scheme which detects vibrations using a piezoelectric material or the like.

SUMMARY

One or more embodiments of the present disclosure provide a display device which has the capability of recognizing information provided by a user. Other embodiments provide a method for driving a display device with such a capability.

According to an embodiment, a display device includes a display panel, a sensor controller, and a driving controller. The display panel includes a plurality of pixels, each of which includes a light emitter to emit light to display an image and a plurality of sensors. Each of the sensors includes a light detector to detect user information. The sensor controller is electrically connected with the sensors and is configured to provide a reset control signal to the plurality of sensors. The driving controller determines a first time point initiating when a user is able to attempt to input the user information, determines a second time point when the user information is actually input, and provides the sensor controller with an enable signal to activate the reset control signal after the first time point and deactivate the reset control signal after the second time point.

According to an embodiment, a method is provided for driving a display device including a display panel including a plurality of pixels, each of which includes a light emitter to emit light to display an image, and a plurality of sensors, each of which includes a light detector to detect user information. The method includes generating a reset control signal; resetting the plurality of sensors in response to the reset control signal; sensing, by the plurality of sensors, the user information; and outputting a readout signal sensed by the plurality of sensors.

Generating the reset control signal includes determining whether the user is able to attempt input of the user information; determining whether to activate the reset control signal depending on the determined result; determining a time point when the information is actually input; and determining whether to deactivate the reset control signal depending on whether the information is actually input.

According to an embodiment, an apparatus includes a plurality of pixels in a display area; a plurality of sensors in the display area; and a controller configured to generate a reset signal for the sensors, wherein the plurality of sensors is configured to detect a user input, and wherein the reset signal is generated based on activation of an application on an electronic device which includes the plurality of pixels and the plurality of sensors.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
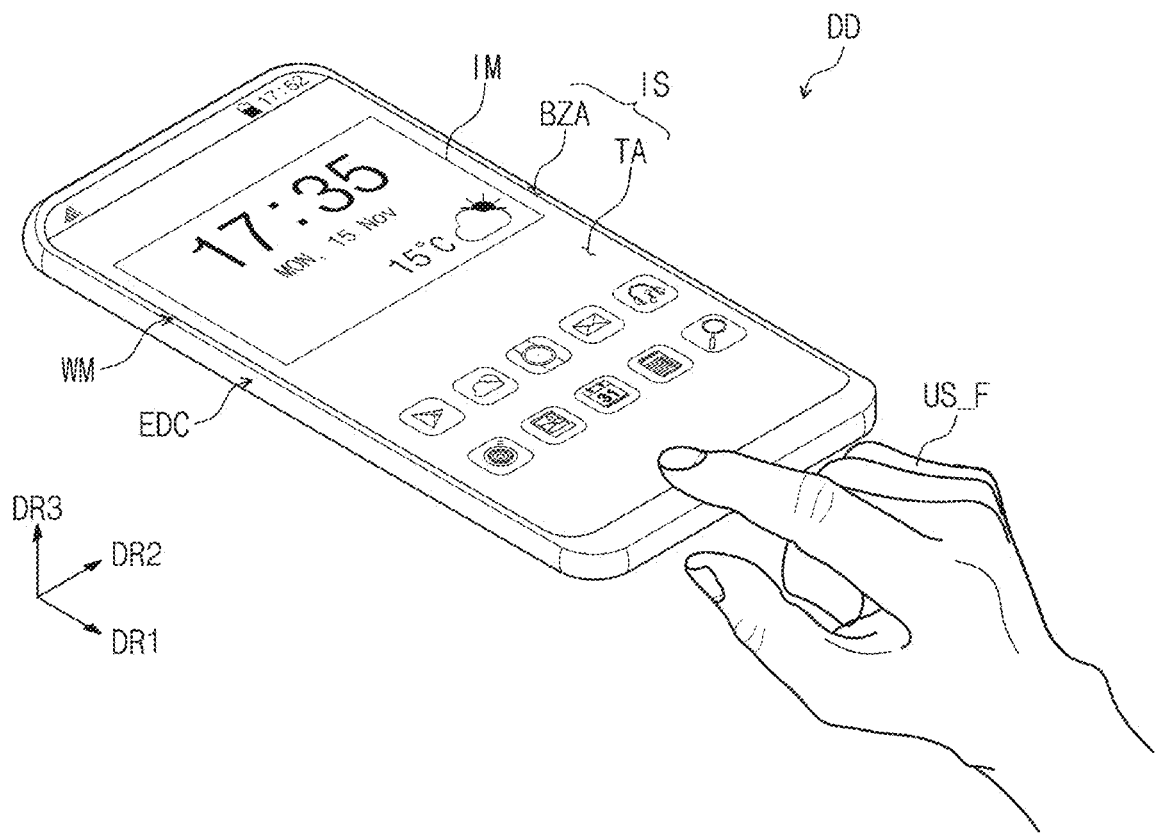
FIG. 1 is a perspective view of a display device according to an embodiment of the present disclosure.

In the specification, the expression that a first component (or area, layer, part, portion, etc.) is "on", "connected with", or "coupled to" a second component means that the first component is directly on, connected with, or coupled to the second component or means that a third component is interposed therebetween.

Like reference numerals refer to like elements. Also, in the drawings, the thicknesses, the ratios, and the dimensions of the components may be exaggerated for effective description of technical contents. The expression "and/or" includes one or more combinations capable of being defined by associated components.

Although the terms "first," "second," etc. may be used herein in describing various components, such components should not be construed as being limited by these terms. These terms are only used to distinguish one component from another component. For example, a first component could be termed a second component without departing from the scope of the claims of the present disclosure, and similarly a second component could be termed a first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. These terms are relative concepts and are described on the basis of the directions shown in the drawings.

It will be further understood that the terms "comprises", "includes", "have", etc. specify the presence of stated features, numbers, steps, operations, components, parts, or a combination thereof, but do not preclude the presence or addition of one or more other features, numbers, steps, operations, components, parts, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to the accompanying drawings.

Figure 2:
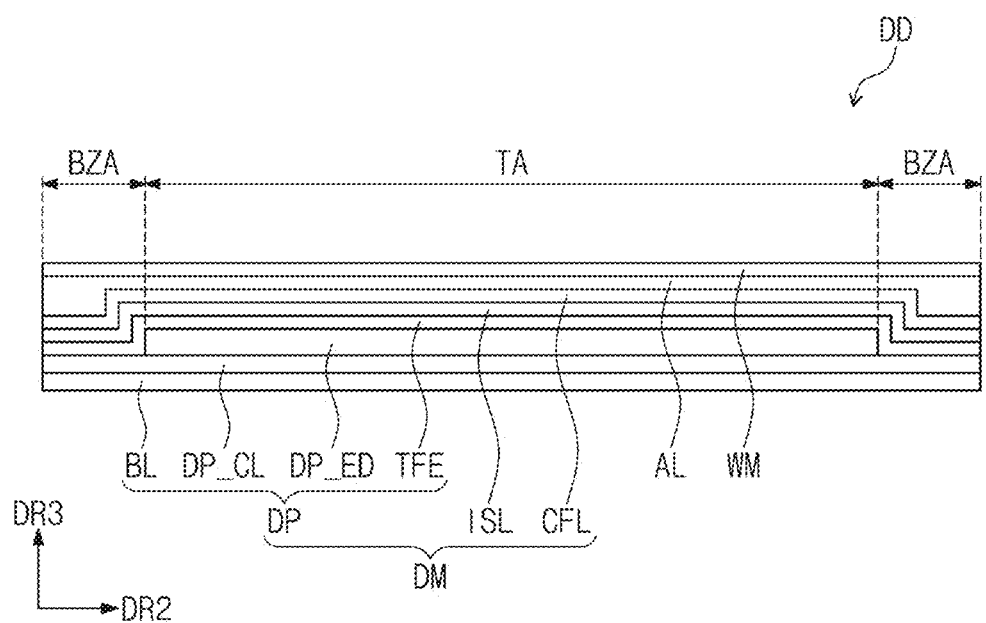
FIG. 2 is a cross-sectional view of a display device according to an embodiment of the present disclosure.

FIG. 1 is a perspective view of a display device DD according to an embodiment of the present disclosure. FIG. 2 is a cross-sectional view of the display device DD according to an embodiment of the present disclosure.

Referring to FIGS. 1 and 2, the display device DD according to an embodiment of the present disclosure may have a rectangular shape having long edges parallel to a first direction DR1 and short edges parallel to a second direction DR2 crossing the first direction DR1. However, the present disclosure is not limited thereto. The display device DD may have various shapes such as a circle and a polygon.

The display device DD may be a device which is activated depending on an electrical signal. The display device DD may include various embodiments. For example, the display device DD may be applied to an electronic device such as, but not limited to, a smart watch, a tablet, a laptop, a computer, a smart television, a navigation device, a personal digital assistant, a medical device, or another type of device.

Hereinafter, a normal direction substantially perpendicular to a plane defined by the first direction DR1 and the second direction DR2 is defined as a third direction DR3. In the specification, the meaning of "when viewed on the plane" may mean "when viewed in the third direction DR3".

An upper surface of the display device DD may include a display surface IS which is parallel to the plane defined by the first direction DR1 and the second direction DR2. Images IM generated by the display device DD may be provided to a user through the display surface IS.

The display surface IS may include a transmission area TA and a bezel area BZA. The transmission area TA may be an area on which the images IM are displayed. The user visually perceives the images IM through the transmission area TA. In an embodiment, the transmission area TA is illustrated in the shape of a quadrangle with rounded vertices. However, this is illustrated as an example. The transmission area TA may have various shapes and is not limited to any one embodiment.

The bezel area BZA may be adjacent to the transmission area TA. The bezel area BZA may have a certain color. The bezel area BZA may partially or completely surround the transmission area TA. Thus, the shape of the transmission area TA may be defined substantially by the bezel area BZA. However, this is illustrated as an example. The bezel area BZA may be disposed adjacent to only one side of the transmission area TA or may be omitted altogether.

The display device DD may detect an external input. The external input may include various types of inputs provided from the outside of the display device DD. For example, the external input may be an external input (e.g., hovering) applied based on proximity to the display device DD, e.g., by being adjacent to the display device DD at a certain distance. The external input may also include contact by a part of the body (e.g., such as a hand US_F of the user) or contact by a separate object (e.g., stylus) or device (e.g., an active pen, a digitizer, or the like). Furthermore, the external input may have various forms such as force, pressure, temperature, and light.

The display device DD may detect various types of information provided by the user. Examples include, but are not limited to, biometric information such as a fingerprint or blood pressure, user access information, or other types of information. An information sensing area capable of sensing information of the user may be provided on the display surface IS of the display device DD. The information sensing area may be provided on all or a portion of the transmission area TA. The case where the entire transmission area TA is utilized as the information sensing area is illustrated as the example of FIG. 1.

The display device DD may include a window WM, a display module DM, and a housing EDC. In an embodiment, the window WM and the housing EDC may be coupled to each other to form the appearance of the display device DD.

A front surface of the window WM may define the display surface IS of the display device DD. The window WM may include an optically transparent insulating material. For example, the window WM may include glass or plastic. The window WM may be a multi-layered structure or a single-layered structure. For example, the window WM may include a plurality of plastic films bonded by an adhesive or may include a glass substrate and a plastic film bonded by an adhesive.

The display module DM may include a display panel DP and an input sensing layer ISL. The display panel DP may display an image depending on an electrical signal, and the input sensing layer ISL may sense an external input. The external input may be provided in various forms, for example, as described herein.

The display panel DP according to an embodiment of the present disclosure may be, but is not particularly limited to, a light emitting display panel. For example, the display panel DP may be an organic light emitting display panel, an inorganic light emitting display panel, or a quantum dot light emitting display panel. A light emitting layer of the organic light emitting display panel may include an organic light emitting material, and a light emitting layer of the inorganic light emitting display panel may include an inorganic light emitting material. A light emitting layer of the quantum dot light emitting display panel may include a quantum dot, a quantum rod, or the like. Hereinafter, a description will be given of the case where the display panel DP is an organic light emitting display panel.

Referring to FIG. 2, in one embodiment, the display panel DP may include a base layer BL, a circuit layer DP_CL, an element layer DP_ED, and an encapsulation layer TFE. The display panel DP according to the present disclosure may be a flexible display panel. However, the present disclosure is not limited thereto. For example, the display panel DP may be a foldable display panel which folds about a folding axis, or may be a rigid display panel.

The base layer BL may include a synthetic resin layer. The synthetic resin layer may be, for example, a polyimide-based resin layer, but the material thereof is not particularly limited. In addition, the base layer BL may include a glass substrate, a metal substrate, an organic/inorganic composite substrate, or the like.

The circuit layer DP_CL may be disposed on the base layer BL. The circuit layer DP_CL may be disposed between the base layer BL and the element layer DP_ED. The circuit layer DP_CL may include at least one insulating layer and a circuit element. Hereinafter, the insulating layer included in the circuit layer DP_CL is referred to as an intermediate insulating layer. The intermediate insulating layer may include at least one intermediate inorganic film and at least one intermediate organic film. The circuit element may include a pixel driving circuit included in each of a plurality of pixels for displaying an image, a sensor driving circuit included in each of a plurality of sensors for recognizing information of the user, and the like. The information of the user may be biometric information, access information of the user, or another type of information. As an example of the present disclosure, the sensor may be a fingerprint sensor, a proximity sensor, an iris sensor, a blood pressure sensor, or the like. Furthermore, the sensor may be an optical sensor which recognizes user information in an optical scheme. The circuit layer DP_CL may further include signal lines connected with the pixel driving circuit and/or the sensor driving circuit.

The element layer DP_ED may include a light emitting element (e.g., light emitter) included in each of pixels and a light receiving element (e.g., light detector) included in each of one or more sensors. As an example of the present disclosure, the light receiving element may be a photodiode. The light receiving element may be a sensor which senses light reflected by a fingerprint of the user or which responds to light. Examples will be described in detail below of the circuit layer DP_CL and the element layer DP_ED, for example, with reference to FIGS. 10, 11A, and 11B.

The encapsulation layer TFE may seal the element layer DP_ED. In one embodiment, the encapsulation layer TFE may include at least one organic film and at least one inorganic film. The inorganic film may include an inorganic material which protects the element layer DP_ED from moisture, oxygen, and debris. The inorganic layer may include, but is not particularly limited to, a silicon nitride layer, a silicon oxynitride layer, a silicon oxide layer, a titanium oxide layer, an aluminum oxide layer, or the like.

The organic film may include an organic material which protects the device layer DP_ED from foreign substances such as dust particles.

The input sensing layer ISL may be disposed on the display panel DP. As an example of the present disclosure, the input sensing layer ISL may be directly disposed on the encapsulation layer TFE. The input sensing layer ISL may be formed directly or indirectly on the display panel DP by a continuous process. For example, when the input sensing layer ISL is directly disposed on the display panel DP, an adhesive film may not be disposed between the input sensing layer ISL and the encapsulation layer TFE. In one embodiment, an adhesive film may be disposed between the input sensing layer ISL and the display panel DP. In this case, the input sensing layer ISL may not be manufactured by a process subsequent to that of the display panel DP and, for example, may be manufactured through a process independent of that of the display panel DP and then fixed on an upper surface of the display panel DP by the adhesive film.

The input sensing layer ISL may sense an external input (e.g., a touch of the user), may change a sensed input into a certain input signal, and may provide the input signal to the display panel DP. The input sensing layer ISL may include a plurality of sensing electrodes for sensing the external input. The sensing electrodes may sense the external input in a capacitive manner or a resistive manner. The display panel DP may receive the input signal from the input sensing layer ISL and may generate an image corresponding to the input signal.

The display module DM may further include a color filter layer CFL. As an example of the present disclosure, the color filter layer CFL may be disposed on the input sensing layer ISL. However, the present disclosure is not limited thereto. For example, the color filter layer CFL may be disposed between the display panel DP and the input sensing layer ISL. In one embodiment, the color filter layer CFL may include a plurality of color filters and a black matrix. A structure of the input sensing layer ISL and the color filter layer CFL will be described in detail below.

The display device DD according to an embodiment of the present disclosure may further include an adhesive layer AL. The window WM may be attached to the color filter layer CFL by the adhesive layer AL. The adhesive layer AL may include an optical clear adhesive, an optically clear adhesive resin, or a pressure sensitive adhesive (PSA).

The housing EDC may be coupled to the window WM. The housing EDC may be coupled to the window WM to provide a certain inner space. The display module DM may be accommodated in the inner space. The housing EDC may include a material with relatively high rigidity. For example, the housing EDC may include glass, plastic, or metal or may include a plurality of frames and/or plates which are composed of a combination thereof. The housing EDC may stably protect components of the display device DD accommodated in the inner space from an external impact. A battery module for supplying power necessary for the overall operation of the display device DD or the like may be disposed between the display module DM and the housing EDC.

Figure 3:
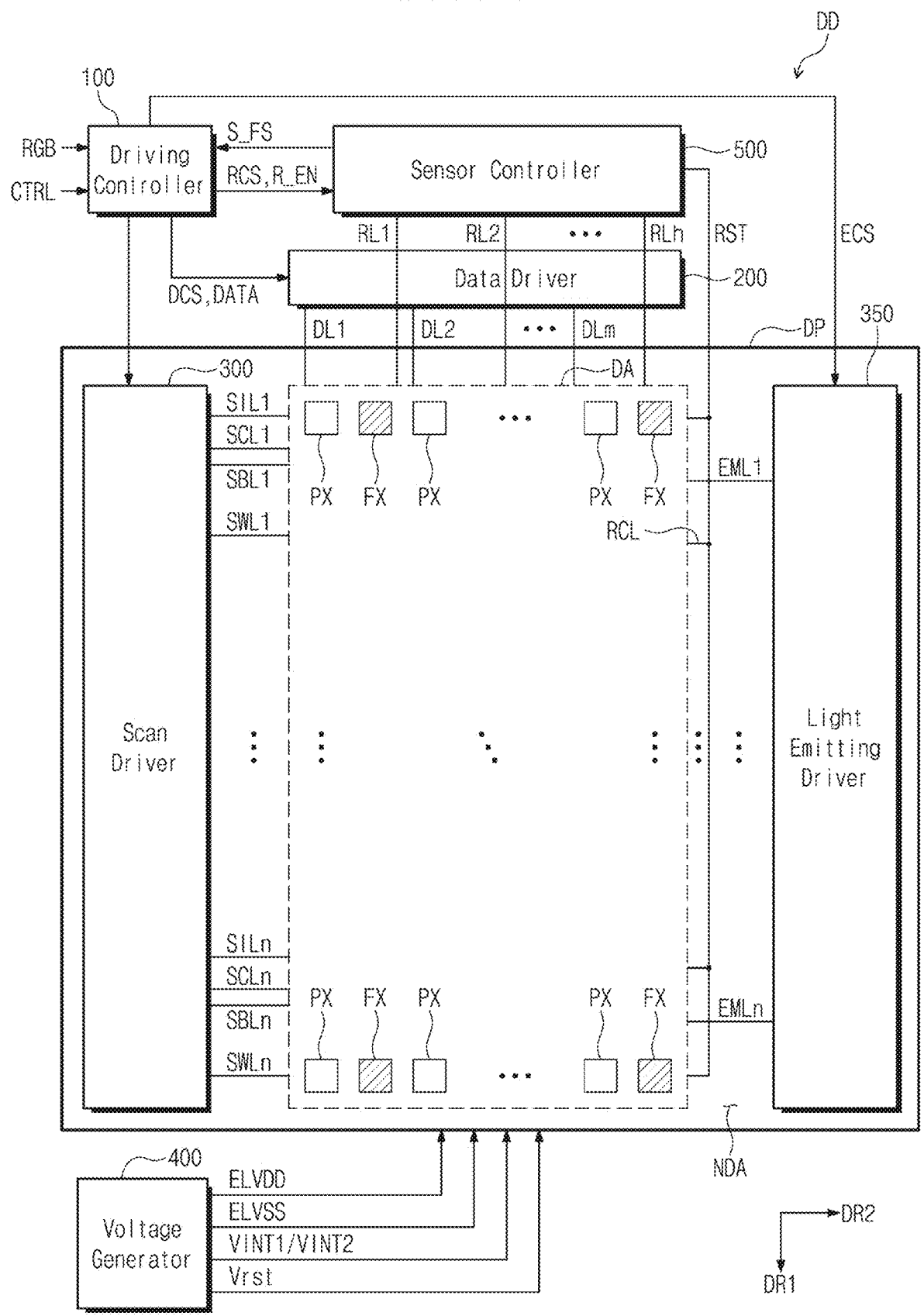
FIG. 3 is a block diagram of a display device according to an embodiment of the present disclosure.

FIG. 3 is a block diagram of a display device according to an embodiment of the present disclosure. The display device may correspond, for example, to display device DD illustrated in FIGS. 1 and 2.

Referring to FIG. 3, the display device DD may include a display panel DP, a panel driver, a driving controller 100, and a sensor controller 500. As an example of the present disclosure, the panel driver may include a data driver 200, a scan driver 300, a light emitting driver 350, and a voltage generator 400.

The driving controller 100 may receive an image signal RGB and a control signal CTRL. The driver controller 100 may generate image data DATA by converting a data format of the image signal RGB to conform with interface specifications with the data driver 200. The driving controller 100 may output a first control signal SCS, a second control signal ECS, a third control signal DCS, and a fourth control signal RCS, which will be described in greater detail below.

The data driver 200 may receive the third control signal DCS and the image data DATA from the driver controller 100. The data driver 200 may convert the image data DATA into data signals and may output the data signals to a plurality of data lines DL1 to DLm to be described below. The data signals may be analog voltages corresponding to a grayscale value of the image data DATA.

The scan driver 300 may receive the first control signal SCS from the driving controller 100. The scan driver 300 may output scan signals to scan lines to be described below in response to the first control signal SCS.

The voltage generator 400 may generate voltages for operation of the display panel DP. In an embodiment, the voltage generator 400 may generate a first driving voltage ELVDD, a second driving voltage ELVSS, a first initialization voltage VINT1, and a second initialization voltage VINT2. As an example of the present disclosure, the voltage generator 400 may further generate a reset voltage Vrst.

The display panel DP may include a display area DA corresponding to the transmission area TA (e.g., as illustrated in FIG. 1) and a non-display area NDA corresponding to the bezel area BZA (e.g., as illustrated in FIG. 1).

The display panel DP may include a plurality of pixels PX arranged in the display area DA and a plurality of sensors FX arranged in the display area DA. As an example of the present disclosure, each of the plurality of sensors FX may be disposed between two pixels PX adjacent to each other. In one embodiment, the plurality of pixels PX and the plurality of sensors FX may be alternately arranged on the first and second directions DR1 and DR2. However, the present disclosure is not limited thereto. In other words, two or more pixels PX may be arranged between two sensors FX adjacent to each other on the first direction DR1 among the plurality of sensors FX, or two or more pixels PX may be arranged between two sensors FX adjacent to each other on the second direction DR2 among the plurality of sensors FX.

The display panel DP may further include initialization scan lines SIL1 to SILn, compensation scan lines SCL1 to SCLn, write scan lines SWL1 to SWLn, black scan lines SBL1 to SBLn, light emitting control lines EML1 to EMLn, data lines DL1 to DLm, and readout lines RL1 to RLh. The initialization scan lines SIL1 to SILn, the compensation scan lines SCL1 to SCLn, the write scan lines SWL1 to SWLn, the black scan lines SBL1 to SBLn, and the light emitting control lines EML1 to EMLn may extend in the second direction DR2. The initialization scan lines SIL1 to SILn, the compensation scan lines SCL1 to SCLn, the write scan lines SWL1 to SWLn, the black scan lines SBL1 to SBLn, and the light emitting control lines EML1 to EMLn may be arranged spaced apart from each other in the first direction DR1. The data lines DL1 to DLm and the readout lines RL1 to RLh may extend in the first direction DR1 and may be arranged spaced apart from each other in the second direction DR2.

The plurality of pixels PX may be electrically connected with the initialization scan lines SIL1 to SILn, the compensation scan lines SCL1 to SCLn, the write scan lines SWL1 to SWLn, the black scan lines SBL1 to SBLn, the light emitting control lines EML1 to EMLn, and the data lines DL1 to DLm. For example, each of the plurality of pixels PX may be electrically connected with a predetermined number (e.g., four) scan lines, e.g., a corresponding initialization scan line, a corresponding compensation scan line, a corresponding write scan line, and a corresponding black scan line. However, the number of scan lines connected with each pixel PX is not limited thereto and may vary among embodiments.

The plurality of sensors FX may be electrically connected with the write scan lines SWL1 to SWLn and the readout lines RL1 to RLh, respectively. Each of the plurality of sensors FX may be electrically connected with corresponding one write scan line. However, the present disclosure is not limited thereto. The number of scan lines connected with each sensor FX may vary. In one embodiment, each of the plurality of sensors FX may be electrically connected with corresponding two or more scan lines (e.g., at least two or more of black scan lines, write scan lines, compensation scan lines, and initialization scan lines). The sensors FX may be directly formed in the display area DA of the display panel DP at the same time as the pixels PX, for example, through a thin film process of forming the pixels PX.

The number of the readout lines RL1 to RLh may be different from (e.g., the less than or equal to) the number of the data lines DL1 to DLm. For example, the number of the readout lines RL1 to RLh may correspond to ½, ¼, ⅛, or another fraction, of the number of the data lines DL1 to DLm.

The display panel DP may further include a reset control line RCL electrically connected with the plurality of sensors FX. The reset control line RCL may be connected with the plurality of sensors FX in common.

The scan driver 300 may be disposed in the non-display area NDA of the display panel DP. As an example of the present disclosure, the scan driver 300 may be directly formed in the non-display area NDA of the display panel DP using the thin film process used to form the pixels PX.

The scan driver 300 may receive the first control signal SCS from the driving controller 100. In response to the first control signal SCS, the scan driver 300 may output initialization scan signals to the initialization scan lines SIL1 to SILn and may output compensation scan signals to the compensation scan lines SCL1 to SCLn. Furthermore, in response to the first control signal SCS, the scan driver 300 may output write scan signals to the write scan lines SWL1 to SWLn and may output black scan signals to the black scan lines SBL1 to SBLn. In one embodiment, the scan driver 300 may include first and second scan drivers. The first scan driver may output the initialization scan signals and the compensation scan signals, and the second scan driver may output the write scan signals and the black scan signals.

The light emitting driver 350 may be disposed in the non-display area NDA of the display panel DP. The light emitting driver 350 may receive the second control signal ECS from the driving controller 100. The light emitting driver 350 may output light emitting control signals to the light emitting control lines EML1 to EMLn in response to the second control signal ECS. In one embodiment, the scan driver 300 may be connected with the light emitting control lines EML1 to EMLn. In this case, the light emitting driver 350 may be omitted, and the scan driver 300 may output light emitting control signals to the light emitting control lines EML1 to EMLn.

The sensor controller 500 may receive the fourth control signal RCS from the driving controller 100. The sensor controller 500 may receive the readout signals from the readout lines RL1 to RLh in response to the fourth control signal RCS. In accordance with one or more embodiments, the readout signals may be signals including user information (e.g., biometric information such as a fingerprint) sensed by the sensors FX.

The sensor controller 500 may process readout signals received from readout lines RL1 to RLh to generate a sensing signal S_FS. The sensor controller 500 may provide the sensing signal S_FS to the driving controller 100. As an example of the present disclosure, the driving controller 100 may recognize the user information based on the sensing signal S_FS. FIG. 3 illustrates the driving controller 100 and the sensor controller 500 as independent components as an example of the present disclosure. However, the driving controller 100 and the sensor controller 500 may be integrated into one component (e.g., one integrated circuit) in other embodiments.

As an example of the present disclosure, the sensor controller 500 may receive an enable signal R_EN from the driving controller 100. The sensor controller 500 may generate a reset control signal RST in response to the enable signal R_EN. The reset control signal RST may be provided to the plurality of sensors FX through the reset control line RCL to reset the plurality of sensors FX.

Figure 4:
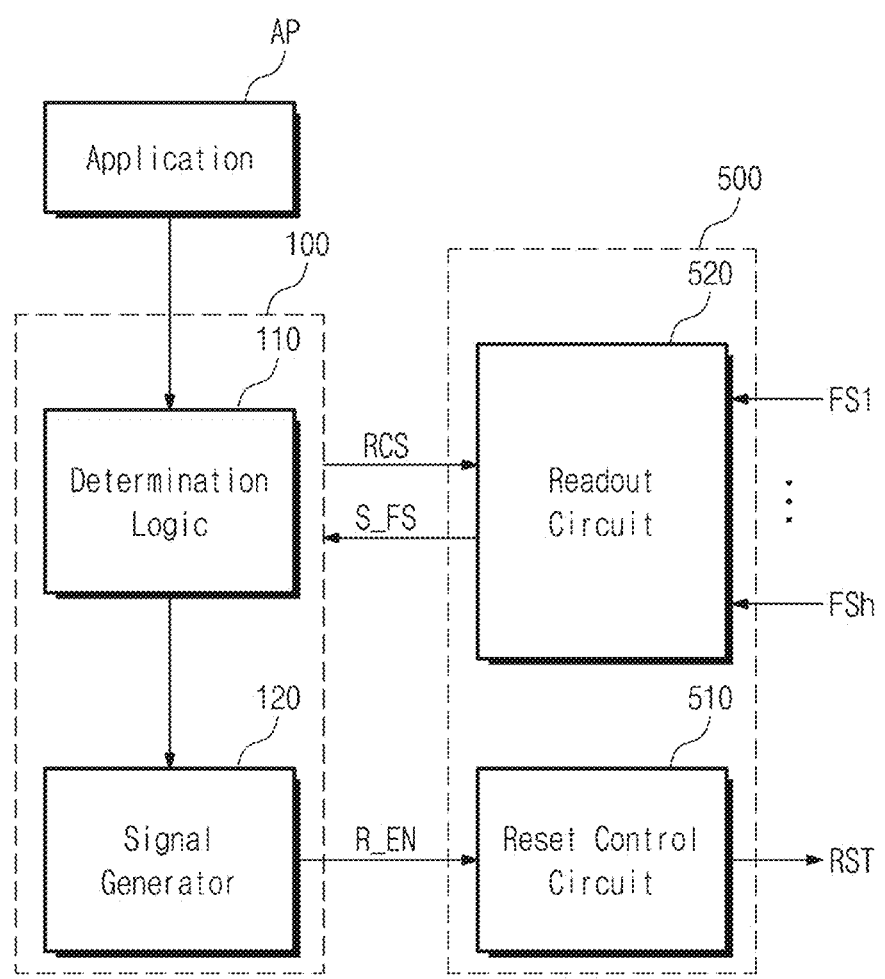
FIG. 4 is an internal block diagram of an embodiment of a driving controller and a sensor controller illustrated in FIG. 3.
Figure 5A:
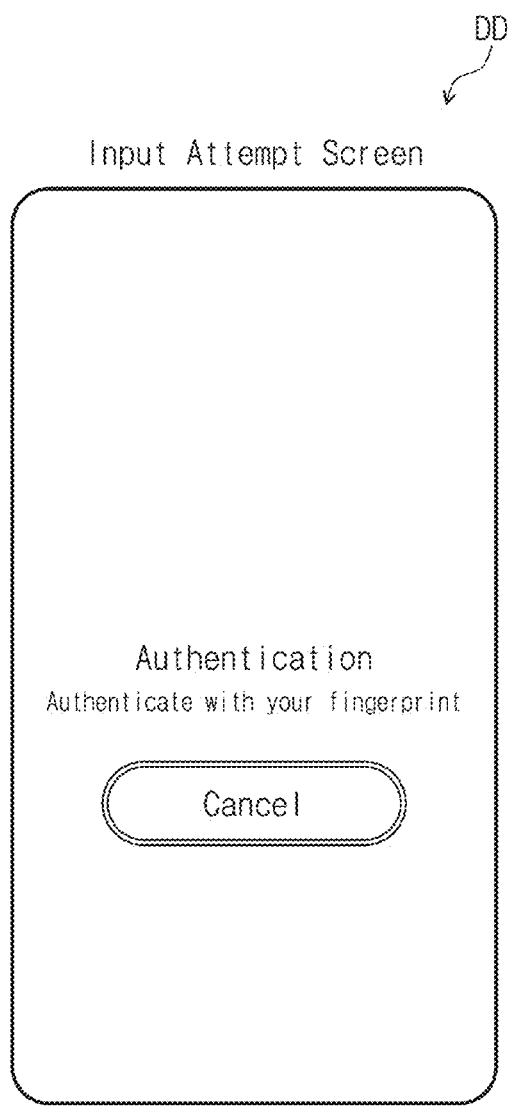
FIG. 5A is a drawing illustrating an information input attempt screen according to an embodiment of the present disclosure.
Figure 5B:
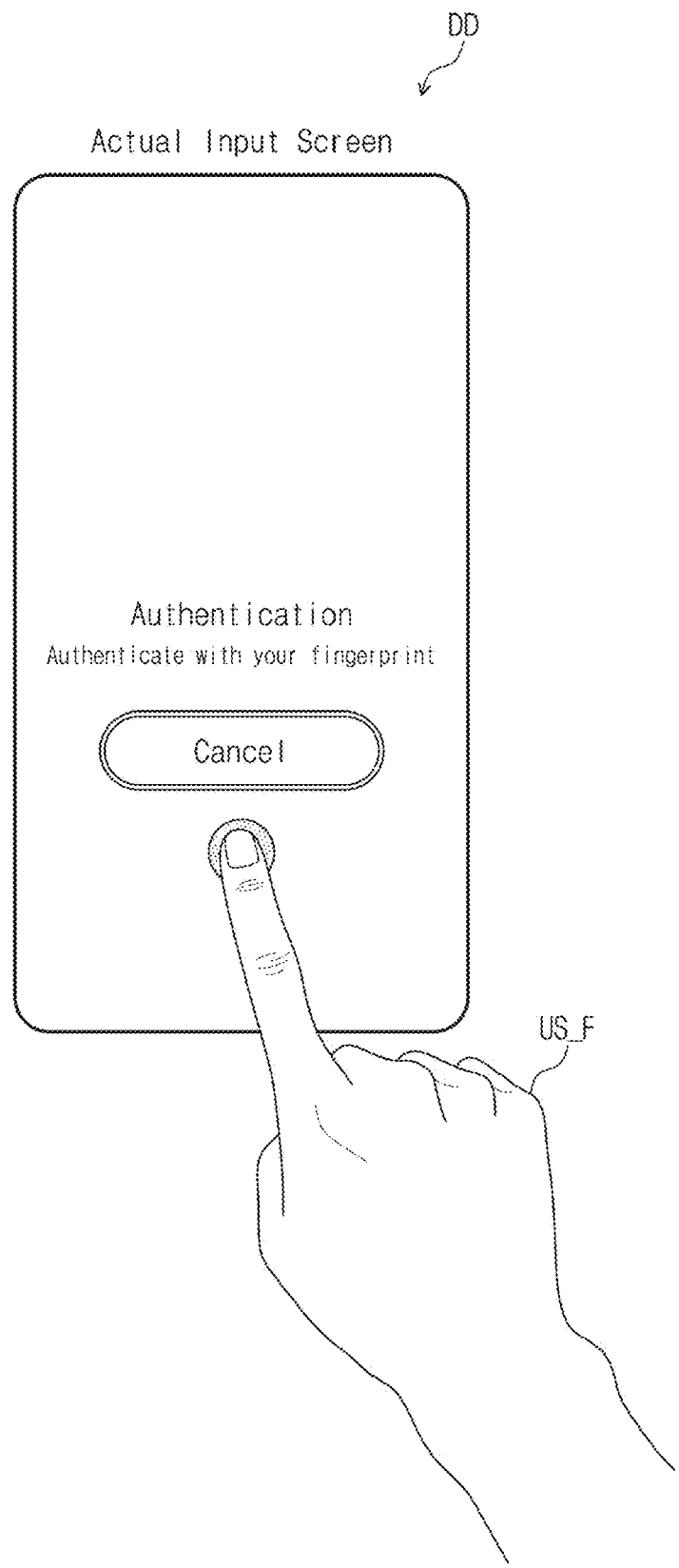
FIG. 5B is a drawing illustrating a process where information is actually input according to an embodiment of the present disclosure.

FIG. 4 is an internal block diagram of the driving controller 100 and the sensor controller 500 illustrated in FIG. 3. FIG. 5A is a drawing illustrating an information input attempt screen according to an embodiment of the present disclosure. FIG. 5B is a drawing illustrating a process where information is actually input according to an embodiment of the present disclosure.

Referring to FIG. 4, when a user runs an application AP for inputting information, the driving controller 100 may receive state information of the application AP from the application AP. As an example of the present disclosure, the application AP may be an application which uses security authentication. The driving controller 100 may then determine whether the user has attempted to input information (e.g., security authentication information). The security authentication information may be information about a fingerprint, an iris, a face, or another type of identifying information.

As an example of the present disclosure, the driving controller 100 may include determination logic 110 and a signal generator 120. The determination logic 110 may determine whether the display device is in a state where it is ready to accept input information from a user (e.g., see FIG. 5A). The starting time point in time when the display device is in such a state (e.g., able to accept input information) may be referred to as an input attempt time point. In one or more embodiments, the input attempt time point may mark the beginning of a process where the plurality of sensors FX are reset prior to receiving the user input information. In one embodiment, the starting time point may coincide with, or be based on, the time when the application AP has been initiated for use on the display device, or otherwise when state information is received from the application AP. After the starting time point, the determination logic 110 determines whether the input information has actually been input during a collection period of the application AP. The starting time point in time when the determination logic detects actual input information may be referred to as an actual input time point.

Thus, in operation, the determination logic may determine that the time for allowing a user to input information (input attempt time point) has occurred. This determination may be based on the state information received from the application AP. As an example of the present disclosure, as illustrated in FIG. 5A, the determination logic 110 may recognize a time point when the display device DD displays a security authentication screen as an input attempt time point (hereinafter referred to as a "first time point"). The display of this screen may indicate that the application is now ready to receive user input information, for example, after a sensor reset period.

When it is identified that the input attempt time point has occurred (e.g., that the user is able to attempt to input information) as a result of the determination of the determination logic 110, the determination logic 110 may transmit the determined result to the signal generator 120. Furthermore, the determination unit 110 may further determine a time point when the user actually inputs the information (e.g., actual input time point). As an example of the present disclosure, as illustrated in FIG. 5B, the determination logic 110 may recognize a time point when the user touches the screen to input fingerprint information as an actual input time point (hereinafter referred to as a "second time point").

The signal generator 120 may generate the enable signal R_EN depending on the determined result and may provide the generated enable signal R_EN to the sensor controller 500. For example, the signal generator 120 may activate the enable signal R_EN at the first time point and may deactivate the enable signal R_EN at the second time point. The sensor controller 500 may include a reset control circuit 510 and a readout circuit 520. The reset control circuit 510 may generate the reset control signal RST in response to the enable signal R_EN. The reset control signal RST may be activated after the first time point where the enable signal R_EN is activated and may be deactivated after the second time point when the enable signal R_EN is deactivated. Herein, the active period of the reset control signal RST may be defined as a reset period of the plurality of sensors FX (refer to FIG. 3).

The readout circuit 520 may receive the fourth control signal RCS from the driving controller 100 and may receive readout signals FS1 to FSh from the plurality of sensors FX in response to the fourth control signal RCS. The readout circuit 520 may process the readout signals FS1 to FSh to generate a sensing signal S_FS and may transmit the sensing signal S_FS to the driving controller 100 in response to a sensing enable signal.

Figure 6:
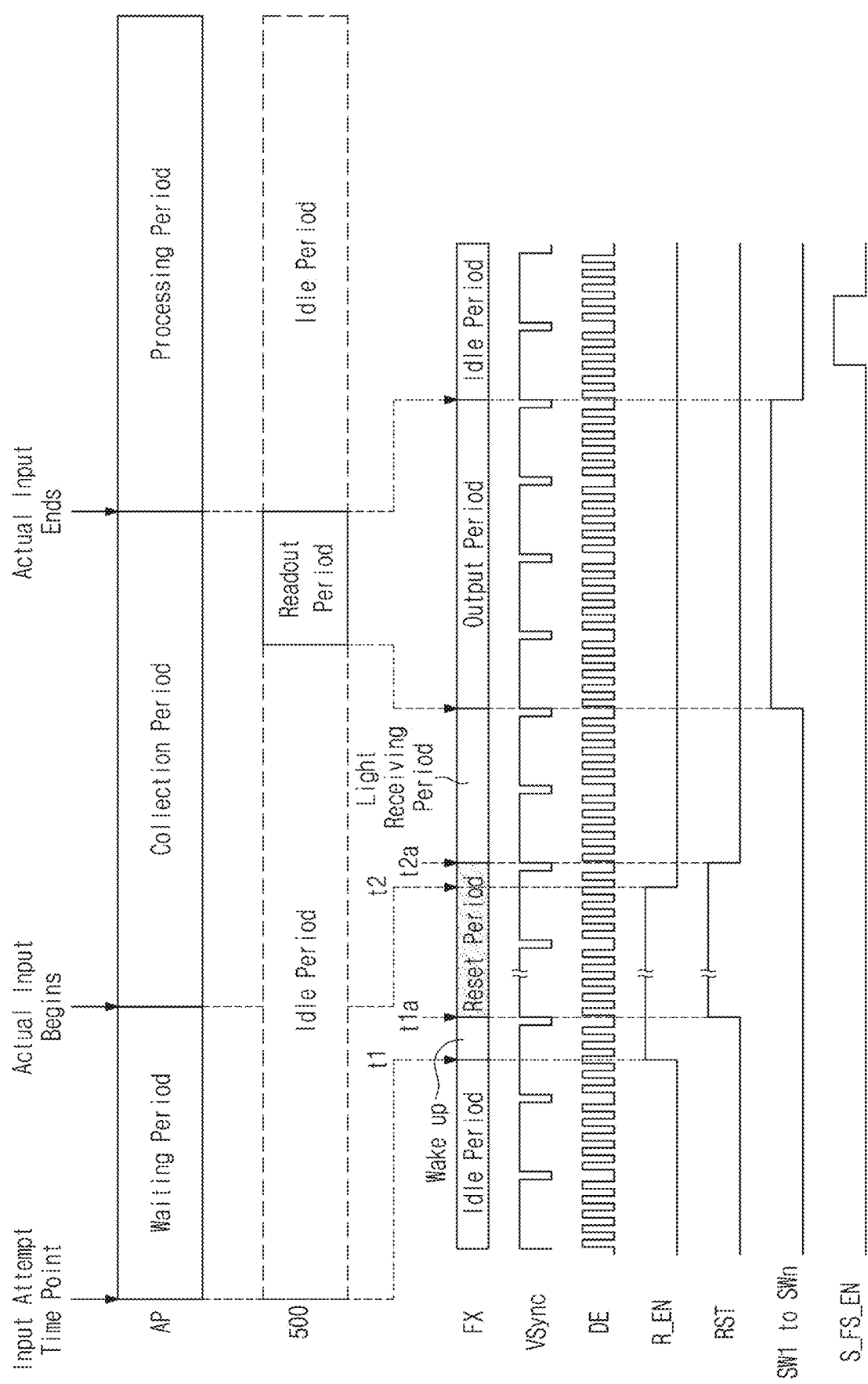
FIG. 6 is a waveform diagram for describing a reset period according to an embodiment of the present disclosure.

FIG. 6 is a waveform diagram for describing the reset period according to an embodiment of the present disclosure.

Referring to FIGS. 4, 5A, and 6, when a user runs a specific application AP and when the application AP is an application which is to identify authentication information of the user, the display device DD may display a screen for user authentication. Herein, the determination logic 110 may recognize the time point when the user runs the application AP as an input attempt time point (e.g., a first time point t1). In one embodiment, the application AP may maintain a waiting period until a time point (e.g., a second time point t2) when the user actually provides an input. When the user actually provides the input at the second time point t2, the application AP may enter a period where information is collected (e.g., a collection period).

The signal generator 120 may activate an enable signal R_EN at the first time point t1, which marks the time point where a user may attempt to input information. For example, this time point may correspond to a time when an associated application AP is initiated. Thereafter, the signal generator 120 may deactivate the enable signal R_EN at the second time point t2 when the user actually provides the input.

The reset control circuit 510 may receive the enable signal R_EN from the signal generator 120. As an example of the present disclosure, the reset control circuit 510 may further receive a vertical sync signal Vsync from a driving controller 100 to generate a reset control signal RST. The reset control circuit 510 may logically combine the enable signal R_EN with the vertical sync signal Vsync to generate the reset control signal RST. However, the present disclosure is not limited thereto. The reset control circuit 510 may generate the reset control circuit RST based on only the enable signal R_EN or may generate the reset control signal RST based on the enable signal R_EN and another control signal (e.g., a data enable signal DE).

As illustrated in FIG. 6, the reset control circuit 510 may activate the reset control signal RST at a first rising time point (hereinafter referred to as a "reset start time point t1a") of the vertical sync signal Vsync after the first time point t1 when the enable signal R_EN is activated. Furthermore, the reset control circuit 510 may deactivate the reset control signal RST at a first rising time point (hereinafter referred to as a "reset end time point t2a") of the vertical sync signal Vsync after the second time point t2 when the enable signal R_EN is deactivated.

In one embodiment, the reset control circuit 510 may activate the reset control signal RST at a first falling time point of the vertical sync signal Vsync after the first time point t1 when the enable signal R_EN is activated. Furthermore, the reset control circuit 510 may deactivate the reset control signal RST at a first falling time point of the vertical sync signal Vsync after the second time point t2 when the enable signal R_EN is deactivated.

In one embodiment, the reset control circuit 510 may activate the reset control signal RST at the first time point t1 when the enable signal R_EN is activated and may deactivate the reset control signal RST at the second time point t2 when the enable signal R_EN is deactivated. In this case, the reset start time point t1a may be identical to the first time point t1, and the reset end time point t2a may be identical to the second time point t2.

A plurality of sensors FX may be reset by receiving the reset control signal RST. The reset control signal RST may be commonly provided to the plurality of sensors FX to reset the plurality of sensors FX at the same time. Herein, an active period (e.g., a high-level period) of the reset control signal RST may be defined as a reset period of the plurality of sensors FX.

The plurality of sensors FX may be maintained in an idle period state before a time point (the first time point t1) when the attempt to input the information occurs by the user. As an example of the present disclosure, when the first time point t1 and the reset start time point t1a are spaced apart from each other at a certain time interval, the plurality of sensors FX may have a wake-up period between the first time point t1 and the reset start time point t1a. However, when the first time point t1 and the reset start time point t1a are identical to each other, the wake-up period may be omitted. The plurality of sensors FX may immediately enter the reset period after an idle period.

As illustrated in FIGS. 5B and 6, when the input is actually generated (or detected by the determination logic 110), the application AP may enter a collection period. Thereafter, when the reset period ends at the reset end time point t2a, the plurality of sensors FX may receive light to collect information provided by the user during a certain period (e.g., a light receiving period). When the light receiving period ends, the plurality of sensors FX may output readout signals FS1 to FSh through readout lines RL1 to RLh in response to write scan signals SW1 to SWn during an output period. The readout circuit 520 may be maintained in the idle period state until the output period starts. When the output period starts, the readout circuit 520 may enter a readout period to receive the readout signals FS1 to FSh output from the plurality of sensors FX. When the output period ends, the plurality of sensors FX may switch to the idle period state.

Meanwhile, the readout circuit 520 may process the received readout signals FS1 to FSh to generate the sensing signal S_FS and may provide the sensing signal S_FS to the driving controller 100 in response to a sensing enable signal S_FS_EN. When the input actually ends (e.g., when the touch or fingerprint recognition of the user ends), the application AP may end the collection period and may enter a processing period for processing the information of the user based on the sensing signal S_FS.

As such, the application AP may reset the plurality of sensors FX after the time point when a user may attempt to input the information (e.g., the input attempt time point), thus preventing stress from being applied to a light receiving element OPD (e.g., refer to FIG. 9A) as the reset period unnecessarily increases. Moreover, the application AP controls when the plurality of sensors FX are activated for purposes of receiving user information (e.g., biometric information such as a fingerprint). This is evident, for example, from the idle period shown in FIG. 6 overlapping the waiting period of the application AP. As a result, the plurality of sensors FX may be left in an idle state during times when the application is not being used. This may reduce power consumption in the display device and improve overall efficiency and performance.

Figure 7:
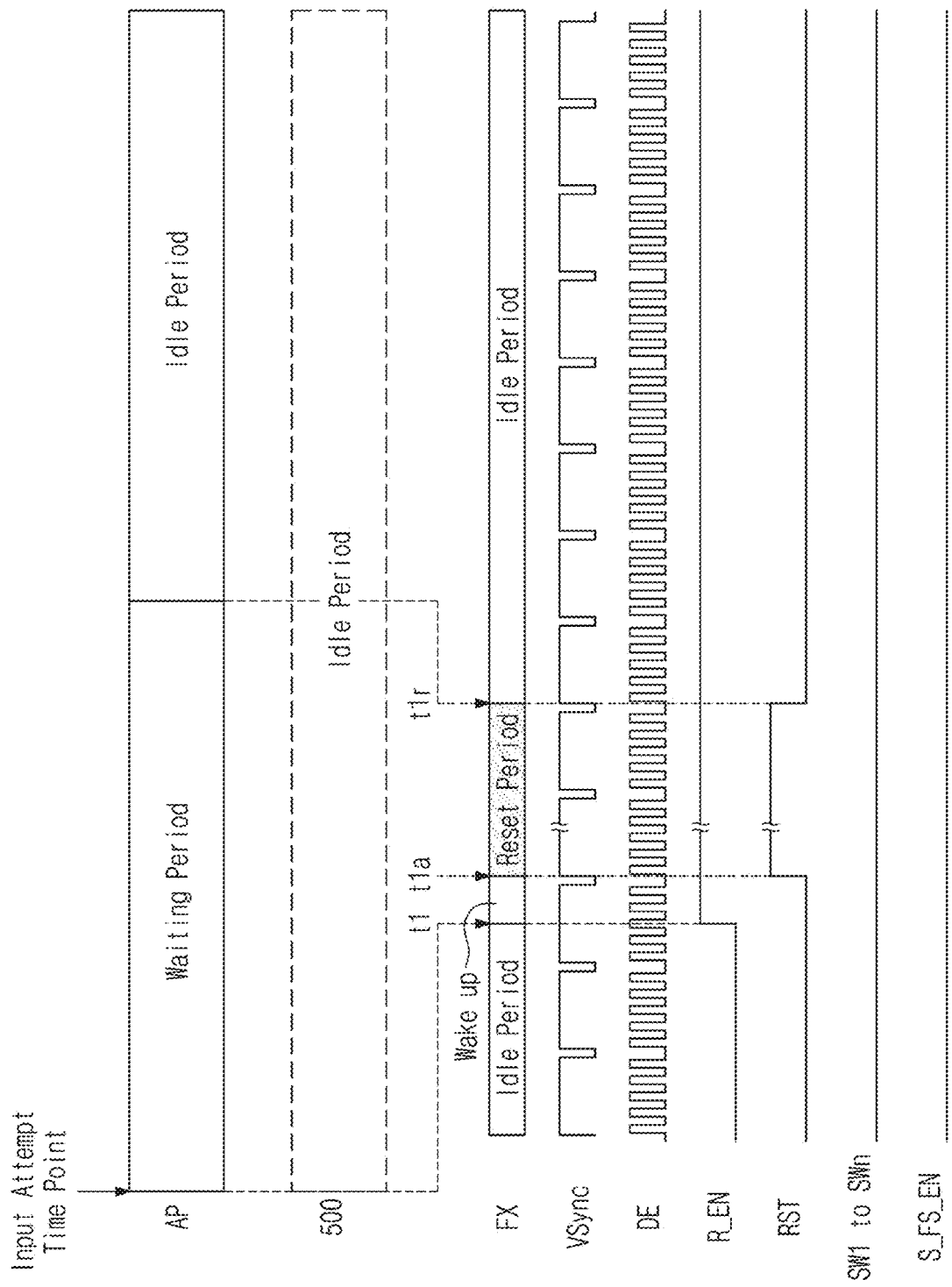
FIG. 7 is a waveform diagram for describing a reset period according to an embodiment of the present disclosure.

FIG. 7 is a waveform diagram for describing a reset period according to an embodiment of the present disclosure. The same reference numerals are given to the same components as those shown in FIG. 6 among the components shown in FIG. 7, and thus a detailed description thereof will be omitted.

Referring to FIGS. 4, 5A, and 7, the signal generator 120 may activate the enable signal R_EN at a first time point t1 when the user attempts to input information. The reset control circuit 510 may receive the enable signal R_EN from the signal generator 120. As an example of the present disclosure, the reset control circuit 510 may further receive a vertical sync signal Vsync from the driving controller 100 to generate the reset control signal RST. The reset control circuit 510 may logically combine the enable signal R_EN with the vertical sync signal Vsync to generate the reset control signal RST, e.g., when the enable signal R_EN is active at the same time one of pulses of the vertical sync signal Vsync occurs, the reset control signal RST may be generated. For example, as illustrated in FIG. 7, the reset control circuit 510 may activate the reset control signal RST at a first rising time point (hereinafter referred to as a "reset start time point t1a") of the vertical sync signal Vsync after the first time point t1 when the enable signal R_EN is activated.

However, when the user does not actually provide an input after the first time point t1, the enable signal R_EN may be continuously maintained in an active state. When the enable signal R_EN is continuously maintained in the active state, the reset control circuit 510 may deactivate the reset control signal RST at a first reference time point t1r when a predetermined reference time elapses.

A plurality of sensors FX may be reset by receiving the reset control signal RST. The reset control signal RST may be commonly provided to the plurality of sensors FX to reset the plurality of sensors FX at the same time. Herein, an active period (e.g., a high-level period) of the reset control signal RST may correspond to a reset period of the plurality of sensors FX.

When the user does not actually provide the input, the plurality of sensors FX may end the reset period and may enter an idle period. When the user does not actually provide the input, a corresponding application AP may also end a waiting period and may enter the idle period. When the user does not actually provide the input, a readout circuit 520 may continuously maintain the idle period state.

Although the reset period starts after the first time point t1, when the input does not actually occur, the readout circuit 520 may prevent the plurality of sensors FX from being unnecessarily reset depending on ending the reset period. As a result, the readout circuit 520 may reduce stress applied to a light receiving element OPD.

Figure 8:
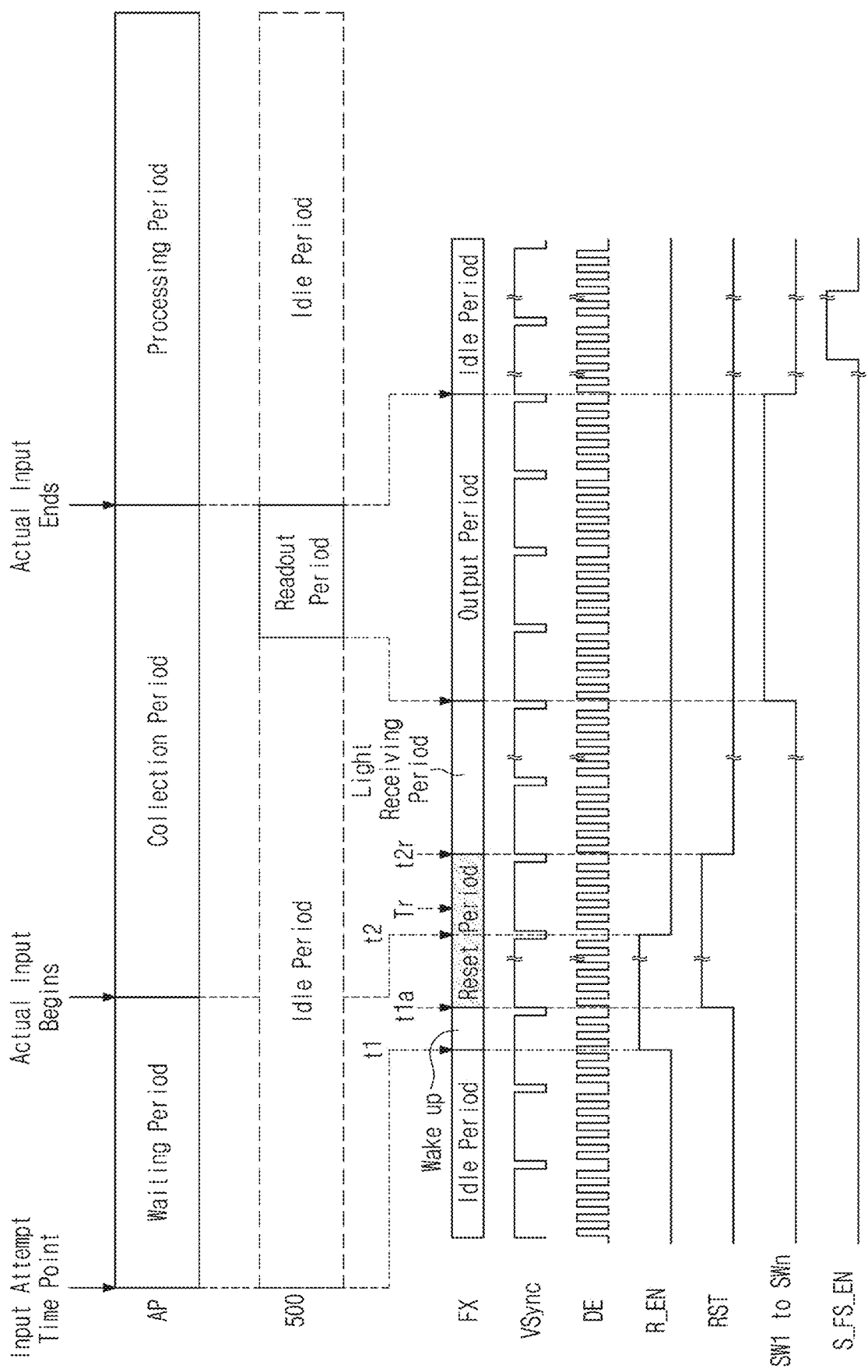
FIG. 8 is a waveform diagram for describing a reset period according to an embodiment of the present disclosure.

FIG. 8 is a waveform diagram for describing a reset period according to an embodiment of the present disclosure. The same reference numerals are given to the same components as those shown in FIG. 6 among the components shown in FIG. 8, and thus a detailed description thereof will be omitted.

Referring to FIGS. 4, 5A, and 8, the signal generator 120 may activate the enable signal R_EN at a first time point t1 when a user attempts to input information. Thereafter, when the input of the user actually occurs at a second time point t2, the enable signal R_EN may switch to an inactive state.

However, when the actual input of the user occurs before a predetermined minimum time Tr elapses from the first time point t1, the reset control circuit 510 may maintain the reset control signal RST in an active state even after the enable signal R_EN is deactivated. Thereafter, when the predetermined minimum time Tr elapses, the reset control circuit 510 may deactivate the reset control signal RST after the minimum time Tr elapses. For example, after the minimum time Tr elapses, the reset control circuit 510 may deactivate the reset control signal RST at a first rising time point (e.g., a second reference time point t2r) of the next vertical sync signal Vsync. As another example, the reset control signal RST may be immediately deactivated at a time point when the minimum time Tr elapses.

Figure 9A:
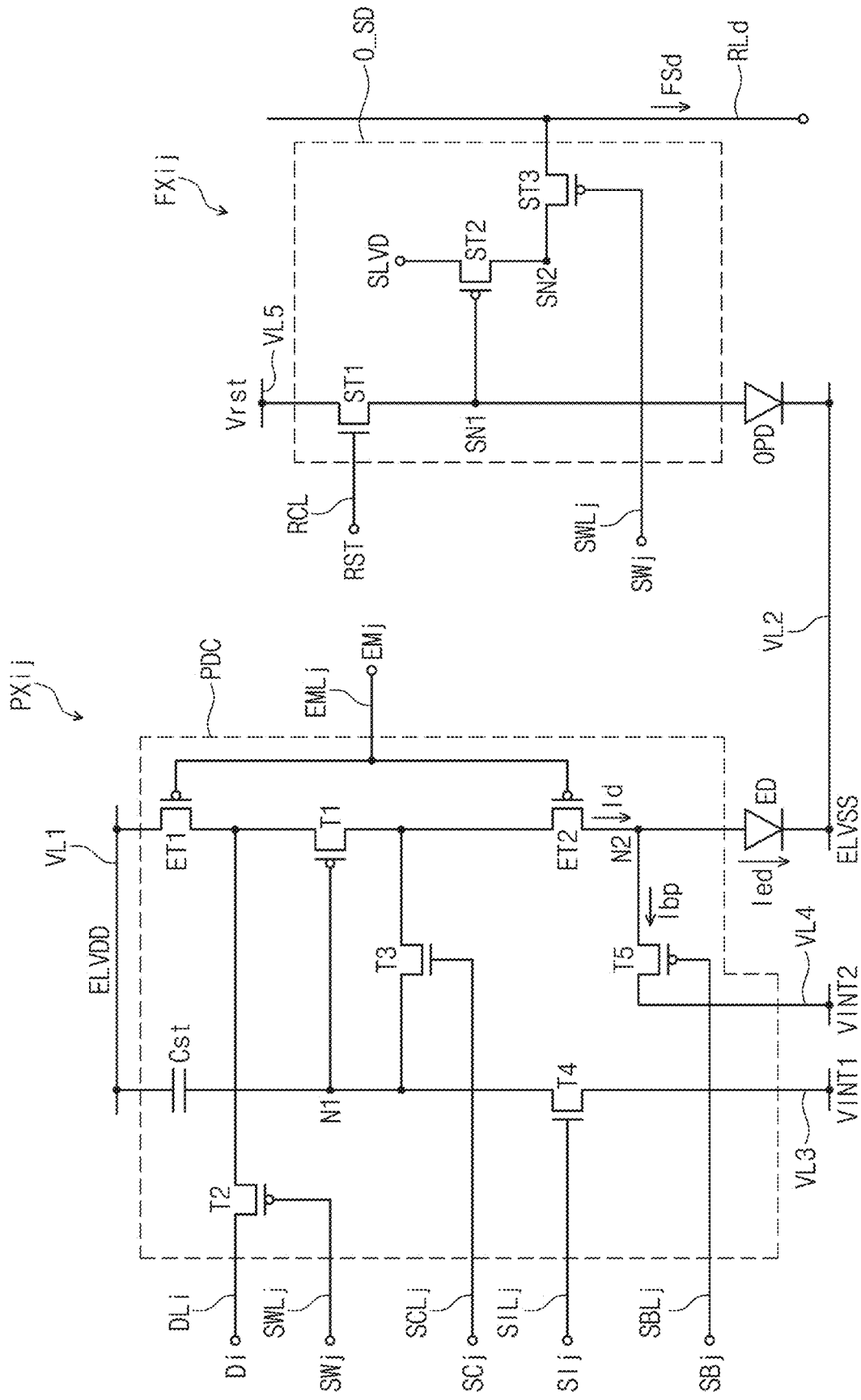
FIG. 9A is a circuit diagram illustrating a pixel and a sensor according to an embodiment of the present disclosure.
Figure 9B:
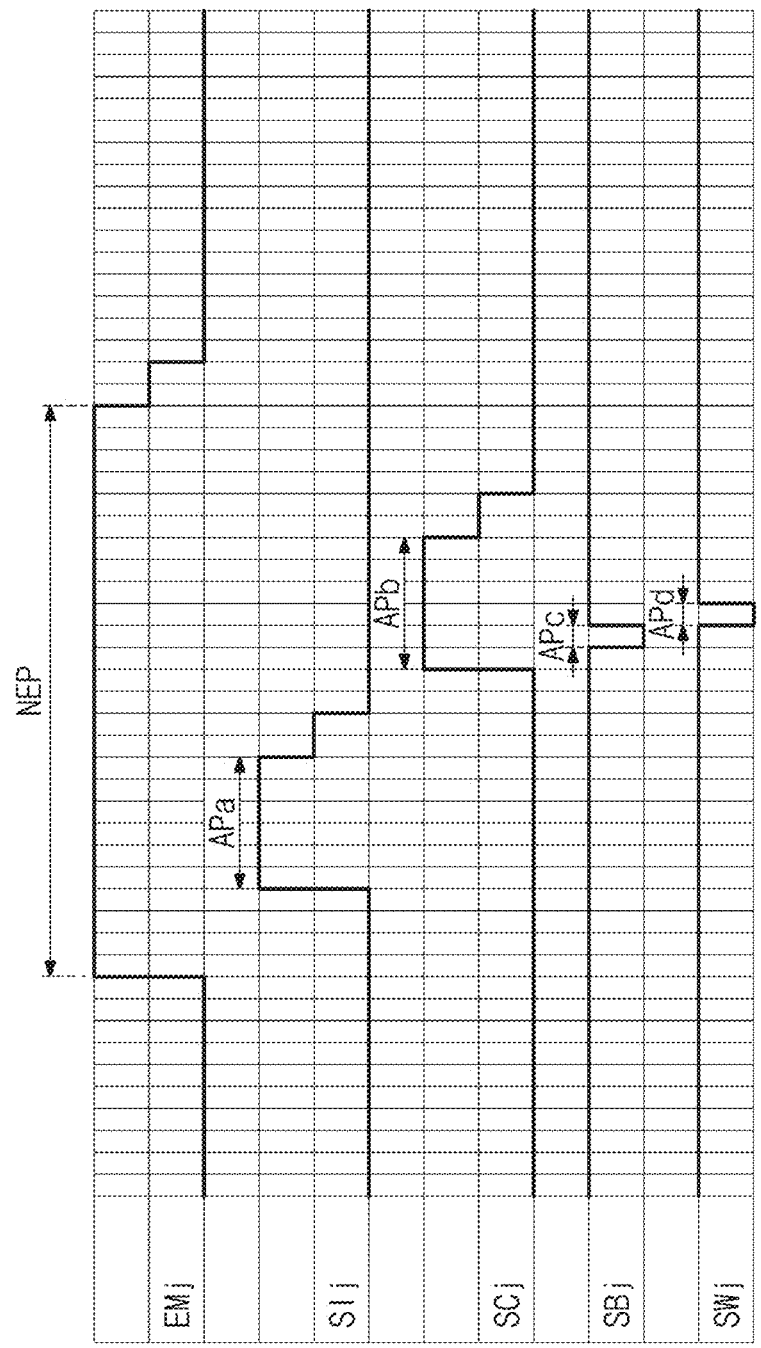
FIG. 9B is a waveform diagram for describing operations of a pixel and a sensor illustrated in FIG. 9A.

FIG. 9A is a circuit diagram illustrating a pixel and a sensor according to an embodiment of the present disclosure. FIG. 9B is a waveform diagram for describing operations of a pixel and a sensor illustrated in FIG. 9A.

An equivalent circuit diagram of one pixel PXij, among a plurality of pixels PX illustrated in FIG. 3, is illustrated as an example in FIG. 9A. Each of the plurality of pixels PX may have the same circuit structure. Thus, a circuit structure of the pixel PXij as a representative example will be described and a detailed description of the remaining pixels will be omitted. Furthermore, an equivalent circuit diagram of one sensor FXij, among a plurality of sensors FX illustrated in FIG. 3, is illustrated as an example in FIG. 9A. Each of the plurality of sensors FX may have the same circuit structure. Thus, a circuit structure of the sensor FXij as a representative example will be described and a detailed description of the remaining sensors will be omitted.

Referring to FIG. 9A, the pixel PXij may be connected with an i-th data line DLi among data lines DL1 to DLm, a j-th initialization scan line SILj among initialization scan lines SIL1 to SILn, a j-th compensation scan line SCLj among compensation scan lines SCL1 to SCLn, a j-th write scan line SWLj among write scan lines SWL1 to SWLn, a j-th black scan line SBLj among black scan lines SBL1 to SBLn, and a j-th light emitting control line EMLj among light emitting control lines EML1 to EMLn.

The pixel PXij may include a light emitting element ED and a pixel driving circuit PDC. The light emitting element ED may be a light emitting diode. As an example of the present disclosure, the light emitting element ED may be an organic light emitting diode including an organic light emitting layer.

The pixel driving circuit PDC may include first to fifth transistors T1, T2, T3, T4, and T5, first and second light emitting control transistors ET1 and ET2, and one capacitor Cst. At least one of the first to fifth transistors T1, T2, T3, T4, and T5 and the first and second light emitting control transistors ET1 and ET2 may be, for example, a transistor having a low-temperature polycrystalline silicon (LTPS) semiconductor layer. One or more of the first to fifth transistors T1, T2, T3, T4, and T5 and the first and second light emitting control transistors ET1 and ET2 may be P-type transistors, and the others may be N-type transistors. For example, the first, second, and fifth transistors T1, T2, and T5 and the first and second light emitting control transistors ET1 and ET2 may be PMOS transistors, and the third and fourth transistors T3 and T4 may be NMOS transistors. At least one of the first to fifth transistors T1, T2, T3, T4, and T5 and the first and second light emitting control transistors ET1 and ET2 may be a transistor having an oxide semiconductor layer. For example, the third and fourth transistors T3 and T4 may be oxide semiconductor transistors, and the first, second, and fifth transistors T1, T2, and T5 and the first and second light emitting control transistors ET1 and ET2 are may be LTPS transistors.

A configuration of the pixel driving circuit PDC according to the present disclosure is not limited to the embodiment illustrated in FIG. 9A. The pixel driving circuit PDC illustrated in FIG. 9A is only an example, and the configuration of the pixel driving circuit PDC may be modified and implemented in other embodiments. For example, all the first to fifth transistors T1, T2, T3, T4, and T5 and the first and second light emitting control transistors ET1 and ET2 may be P-type transistors or N-type transistors.

The j-th initialization scan line SILj, the jth compensation scan line SCLj, the j-th write scan line SWLj, the j-th black scan line SBLj, and the j-th light emitting control line EMLj may deliver a j-th initialization scan signal Sij (or referred to as a third scan signal), a j-th compensation scan signal SCj (or referred to as a second scan signal), a j-th write scan signal SWj (or referred to as a first scan signal), a j-th black scan signal SBj, and a j-th light emitting control signal EMj to the pixel PXij, respectively. The i-th data line DLi may deliver an i-th data signal Di to the pixel PXij. The i-th data signal Di may have a voltage level corresponding to the image signal RGB (e.g., refer to FIG. 3) input to the display device DD (e.g., refer to FIG. 3).

A first driving voltage line VL1 and a second driving voltage line VL2 may deliver a first driving voltage ELVDD and a second driving voltage ELVSS to the pixel PXij, respectively. Furthermore, a first initialization voltage line VL3 and a second initialization voltage line VL4 may deliver a first initialization voltage VINT1 and a second initialization voltage VINT2 to the pixel PXij, respectively.

The first transistor T1 may be connected between the first driving voltage line VL1 for receiving a first driving voltage ELVDD and a light emitting element ED. The first transistor T1 may include a first electrode connected with the first driving voltage line VL1 through the first light emitting control transistor ET1, a second electrode connected with the light emitting element ED (e.g., an anode electrode) through the second light emitting control transistor ET2, and a third electrode (e.g., a gate electrode) connected with one end (e.g., a first node N1) of the capacitor Cst. The first transistor T1 may receive the i-th data signal Di delivered by the i-th data line DLi depending on the switching operation of the second transistor T2 and may supply a driving current Id to the light emitting element ED.

The second transistor T2 may be connected between the i-th data line DLi and the first electrode of the first transistor T1. The second transistor T2 may include a first electrode connected with the i-th data line DLi, a second electrode connected with the first electrode of the first transistor T1, and a third electrode (e.g., a gate electrode) connected with the j-th write scan line SWLj. The second transistor T2 may be turned on according to the j-th write scan signal SWj, delivered through the j-th write scan line SWLj, to deliver the i-th data signal Di (delivered from the ith data line DLi) to the first electrode of the first transistor T1.

The third transistor T3 may be connected between the second electrode of the first transistor T1 and the first node N1. The third transistor T3 may include a first electrode connected with the third electrode of the first transistor T1, a second electrode connected with the second electrode of the first transistor T1, and a third electrode (e.g., a gate electrode) connected with the j-th compensation scan line SCLj. The third transistor T3 may be turned on according to the j-th compensation scan signal SCj delivered through the j-th compensation scan line SCLj to connect the third electrode of the first transistor T1 and the second electrode of the first transistor T1, thus diode-connecting the first transistor T1.

The fourth transistor T4 may be connected between the first initialization voltage line VL3 through which the first initialization voltage VINT1 is applied and the first node N1. The fourth transistor T4 may include a first electrode connected with the first initialization voltage line VL3 through which the first initialization voltage VINT1 is delivered, a second electrode connected with the first node N1, and a third electrode (e.g., a gate electrode) connected with the j-th initialization scan line SILj. The fourth transistor T4 may be turned on according to the j-th initialization scan signal SIj delivered through the j-th initialization scan line SILj. When turned on, the fourth transistor T4 may deliver the first initialization voltage VINT1 to the first node N1 in order to initialize a potential of the third electrode of the first transistor T1 (e.g., a potential of the first node N1).

The first light emitting control transistor ET1 may include a first electrode connected with the first driving voltage line VL1, a second electrode connected with the first electrode of the first transistor T1, and a third electrode (e.g., a gate electrode) connected with the j-th light emitting control line EMLj.

The second light emitting control transistor ET2 may include a first electrode connected with the second electrode of the first transistor T1, a second electrode connected with the light emitting element ED (e.g., an anode electrode), and a third electrode (e.g., a gate electrode) connected with the j-th light emitting control line EMLj.

The first and second light emitting control transistors ET1 and ET2 may be turned on at the same time according to the jth light emitting control signal EMj delivered through the j-th light emitting control line EMLj. The first driving voltage ELVDD applied through the first light emitting control transistor ET1, when turned on, may be compensated for through the diode-connected transistor T1 and then may be delivered to the light emitting element ED.

The fifth transistor T5 may include a first electrode connected with the second initialization voltage line VL4 through which the second initialization voltage VINT2 is delivered, a second electrode connected with the second electrode of the second light emitting control transistor ET2, and a third electrode (e.g., a gate electrode) connected with the j-th black scan line SBLj. The second initialization voltage VINT2 may have a voltage level which is different from (e.g., less than or equal to) the first initialization voltage VINT1. The fifth transistor T5 may be turned on according to the j-th black scan signal SBj delivered through the j-th black scan line SBLj. When turned on, the fifth transistor T5 may deliver the second initialization voltage VINT2 to the anode electrode of the light emitting element ED, in order to initialize a potential of the anode electrode.

As described above, one end of the capacitor Cst may be connected with the third electrode of the first transistor T1, and the other end of the capacitor Cst may be connected with the first driving voltage line VL1. The cathode electrode of the light emitting element ED may be connected with the second driving voltage line VL2 which delivers the second driving voltage ELVSS. The second driving voltage ELVSS may have a voltage level different from (e.g., lower than) the first driving voltage ELVDD. As an example of the present disclosure, the second driving voltage ELVSS may have a voltage level lower than the first and second initialization voltages VINT1 and VINT2.

Referring to FIGS. 9A and 9B, the j-th light emitting control signal EMj may have a first (e.g., high) level during a non-light emitting period NEP and may have a second (e.g., low) level during the remaining period (e.g., a light emitting period). Within the non-light emitting period NEP, the j-th initialization scan signal SIj may be activated. During an active period APa (hereinafter referred to as a "first active period") of the j-th initialization scan signal SIj, when the j-th initialization scan signal SIj of the high level is provided through the j-th initialization scan line SILj, the fourth transistor T4 may be turned on in response to the j-th initialization scan signal SIj of the high level. The first initialization voltage VINT1 may be delivered to the third electrode of the first transistor T1 through the fourth transistor T4 when turned on, and the first node N1 may be initialized to the first initialization voltage VINT1.

Next, when the j-th compensation scan signal SCj is activated and when the j-th compensation scan signal SCj of the high level is provided through the j-th compensation scan line SCLj during an active period APb (hereinafter referred to as a "second active period") of the j-th compensation scan signal SCj, the third transistor T3 may be turned on. The first transistor T1 may be diode-connected by the third transistor T3 when turned on and may be forward-biased. In one embodiment, the first active period APa may not overlap the second active period APb.

The j-th black scan signal SBj may be activated within the second active period of the j-th compensation scan signal SCj. The j-th black scan signal BSj may have a predetermined (e.g., low level) during an active period APc (hereinafter referred to as a "third active period"). During the third active period APc, the fifth transistor T5 may be turned on by receiving the j-th black scan signal SBj of the low level through the j-th black scan line SBLj. A portion of the driving current Id may be drained through the fifth transistor T5 as a bypass current Ibp. The third active period APc may overlap the second active period APb. The second active period APb may be different from (e.g., greater) in duration than the third active period APc.

The j-th write scan signal SWj may be activated within the second active period APb. The j-th write scan signal SWj may have a predetermined (e.g., low) level during an active period APd (hereinafter referred to as a "fourth active period"). During the fourth active period APd, the second transistor T2 may be turned on by the j-th write scan signal SWj of the low level. Then, a compensation voltage ("Di–Vth"), in which the i-th data signal Di provided from the i-th data line DLi decreases by a threshold voltage Vth of the first transistor T1, may be applied to the third electrode of the first transistor T1. For example, a potential of the third electrode of the first transistor T1 may be the compensation voltage ("Di–Vth"). The fourth active period APd may overlap the second active period APb. The second active period APb may be different (e.g., greater) in duration than the fourth active period APd. The third active period APc may precede the fourth active period APd and may fail to overlap the fourth active period APd.

Next, the j-th light emitting control signal EMj provided from the j-th light emitting control line EMLj may change from the high level to the low level. The first and second light emitting control transistors ET1 and ET2 may be turned on by the j-th light emitting control signal EMj of the low level. Then, as the driving current Id according to a voltage difference between the voltage of the third electrode of the first transistor T1 and the first driving voltage ELVDD occurs and the driving current Id is supplied to the light emitting element ED through the second light emitting control transistor ET2, current led may flow in the light emitting element ED.

Referring again to FIG. 9A, the sensor FX may include a light receiving element OPD and a sensor driving circuit O_SD connected with the light receiving element OPD. The sensor driving circuit O_SD may be connected with the d-th readout line RLd among the readout lines RL1 to RLh, the j-th write scan line SWLj, and the reset control line RCL.

The light receiving element OPD may be an organic photodiode including an organic material as a photoelectric conversion layer. The case where the sensor FXij includes the one light receiving element OPD is illustrated as an example in FIG. 9A, but the present disclosure is not limited thereto. For example, the sensor FXij may include a plurality of light receiving elements connected in parallel with each other. In this case, the plurality of light receiving elements may be connected in common with one sensor driving circuit O_SD.

The anode electrode of the light receiving element OPD may be connected with the first sensing node SN1, and the cathode electrode of the light receiving element OPD may be connected with the second driving voltage line VL2 which delivers the second driving voltage ELVSS. In one embodiment, the cathode electrode of the light receiving element OPD may be electrically connected with the cathode electrode of the light emitting element ED. As an example of the present disclosure, the cathode electrode of the light receiving element OPD may be integrally configured with the cathode electrode of the light emitting element ED to form a common cathode electrode.

The sensor driving circuit O_SD may include three transistors ST1 to ST3. The three transistors ST1 to ST3 may be a reset transistor ST1, an amplification transistor ST2, and an output transistor ST3, respectively. At least one of the reset transistor ST1, the amplification transistor ST2, or the output transistor ST3 may be an oxide semiconductor transistor. As an example of the present disclosure, the reset transistor ST1 may be an oxide semiconductor transistor, and the amplification transistor ST2 and the output transistor ST3 may be LTPS transistors. However, the present disclosure is not limited thereto. The reset transistor ST1 and the output transistor ST3 may at least be oxide semiconductor transistors, and the amplification transistor ST2 may be an LTPS transistor.

Furthermore, one or more of the reset transistor ST1, the amplification transistor ST2, and the output transistor ST3 may be P-type transistors, and the others may be N-type transistors. The reset transistor ST1 and the output transistor ST3 may be different types of transistors. As an example of the present disclosure, the amplification transistor ST2 and the output transistor ST3 may be PMOS transistors, and the reset transistor ST1 may be an NMOS transistor. However, the present disclosure is not limited thereto. All the reset transistor ST1, the amplification transistor ST2, and the output transistor ST3 may be N-type transistors or P-type transistors.

As an example of the present disclosure, one or more (e.g., the reset transistor ST1) of the reset transistor ST1, the amplification transistor ST2, or the output transistor ST3 may be transistors of the same type as the third and fourth transistors T3 and T4 of the pixel PXij. The amplification transistor ST2 and the output transistor ST3 may be transistors of the same type as the first, second, and fifth transistors T1, T2, and T5 and the first and second light emitting control transistors ET1 and ET2 of the pixel PXij. In one embodiment, the reset transistor ST1 and the output transistor ST3 may be transistors of the same type as the third and fourth transistors T3 and T4 of the pixel PXij.

The circuit configuration of the sensor driving circuit O_SD according to the present disclosure is not limited to FIG. 9A. The sensor driving circuit O_SD illustrated in FIG. 9A is only an example, and the configuration of the sensor driving circuit O_SD may be modified and implemented in other embodiments.

The reset transistor ST1 may include a first electrode connected with a reset voltage line VL5 which receives the reset voltage Vrst, a second electrode connected with the first sensing node SN1, and a third electrode which receives the reset control signal RST. The reset transistor ST1 may reset a potential of the first sensing node SN1 to the reset voltage Vrst in response to the reset control signal RST. The reset control signal RST may be a signal provided through the reset control line RCL. As an example of the present disclosure, the reset voltage Vrst may at least have a voltage level different from (e.g., lower) than the second driving voltage ELVSS during an active period of the reset control signal RST. The reset voltage Vrst may be a DC voltage which is maintained at a voltage level lower than that of the second driving voltage ELVSS. As an example of the present disclosure, the reset voltage Vrst may be about −4.5 V.

In one embodiment, the reset transistor ST1 may include a plurality of sub-reset transistors connected in series with each other. For example, the reset transistor ST1 may include two sub-reset transistors (hereinafter referred to as "first and second sub-reset transistors"). In this case, a third (gate) electrode of the first sub-reset transistor and a third (gate) electrode of the second sub-reset transistor may be connected with the reset control line RCL. Furthermore, a second electrode of the first sub-reset transistor and a first electrode of the second sub-reset transistor may be electrically connected with each other. Furthermore, the reset voltage Vrst may be applied to a first electrode of the first sub-reset transistor, and a second electrode of the second sub-reset transistor may be electrically connected with the first sensing node SN1. However, the number of sub-reset transistors is not limited thereto, which may be variously modified.

When the reset transistor ST1 is turned on during the reset period in response to the reset control signal RST, the first sensing node SN1 may be reset by the reset voltage Vrst.

The amplification transistor ST2 may include a first electrode for receiving a sensing driving voltage SLVD, a second electrode connected with a second sensing node SN2, and a third electrode connected with the first sensing node SN1. The amplification transistor ST2 may be turned on according to the potential of the first sensing node SN1 to apply the sensing driving voltage SLVD to the second sensing node SN2. As an example of the present disclosure, the sensing driving voltage SLVD may be the first driving voltage ELVDD or one of the first or second initialization voltages VINT1 and VINT2. When the sensing driving voltage SLVD is the first driving voltage ELVDD, the first electrode of the amplification transistor ST2 may be electronically connected with the first driving voltage line VL1. When the sensing driving voltage SLVD is the first initialization voltage VINT1, the first electrode of the amplification transistor ST2 may be electrically connected with the first initialization voltage line VL3. When the sensing driving voltage SLVD is the second initialization voltage VINT2, the first electrode of the amplification transistor ST2 may be electrically connected with the second initialization voltage line VL4.

The output transistor ST3 may include a first electrode connected with the second sensing node SN2, a second electrode connected with the d-th readout line RLd, and a third (gate) electrode for receiving an output control signal. The output transistor ST3 may deliver the readout signal FSd to the dth readout line RLd in response to the output control signal. The output control signal may be the j-th write scan signal SWj which is provided through the j-th write scan line SWLj. For example, the output transistor ST3 may receive the j-th write scan signal SWj provided from the j-th write scan line SWLj as the output control signal. The case where the j-th write scan signal SWj is provided to the output transistor ST3 as the output control signal is illustrated as an example in FIG. 9A, but the present disclosure is not limited thereto. For example, the j-th initialization scan signal SIj or the j-th compensation scan signal SCj may be provided to the output transistor ST3 as the output control signal.

The light receiving element OPD of the sensor FXij may be exposed to light during the light emitting period of the light emitting element ED. The light may be light output from a pixel having a specific color (e.g., a green color) among the plurality of pixels PX.

When biometric information is a fingerprint and when the user's hand US_F (e.g., refer to FIG. 1) touches the display surface IS (refer to FIG. 1), the light receiving element OPD may generate photocharges corresponding to light reflected by a ridge of the fingerprint or a valley between ridges. The amount of current flowing through the light receiving element OPD may be changed by the generated photocharges. When the light receiving element OPD receives the light reflected by a ridge of the fingerprint, the current flowing through the light receiving element OPD may be referred to as a first current. When the light receiving element OPD receives the light reflected by a valley of the fingerprint, the current flowing through the light receiving element OPD may be referred to as a second current. Because there is a difference in the amount of light between light reflected by a ridge of the fingerprint and light reflected by a valley of the fingerprint, the difference in the amount of light is represented as a difference between the first and second currents. When the first current flows through the light receiving element OPD, a potential of the first sensing node SN1 may be referred to as a first potential. When the second current flows through the light receiving element OPD, a potential of the first sensing node SN1 may be referred to as a second potential. As an example of the present disclosure, the first current may be greater than the second current. In this case, the first potential may be lower than the second potential.

The amplification transistor ST2 may be a source follower amplifier which generates a source-drain current in proportion to the potential of the first sensing node SN1, which is input to the third electrode of the amplification transistor ST2.

During the fourth active period APd (e.g., the fingerprint sensing period), the j-th write scan signal SWj of the low level may be provided through the j-th write scan line SWLj. When the output transistor ST3 is turned on in response to the j-th write scan signal SWj of the low level, the sensing signal FSd corresponding to a current flowing through the amplification transistor ST2 may be output to the d-th readout line RLd.

Next, when the reset control signal RST of the high level is provided to the reset transistor ST1 during the reset period, the reset transistor ST1 may be turned on. The reset period may correspond to an active period (e.g., a high-level period) of the reset control signal RST. In one embodiment, the reset transistor ST1 may be a PMOS transistor. In this case, the reset period may correspond to a low level period of the reset control signal. During the reset period, the first sensing node SN1 may be reset to the reset voltage Vrst. As an example of the present disclosure, the reset voltage Vrst may have a voltage level lower than the second driving voltage ELVSS.

When the reset period ends, the light sensing element OPD may generate photoelectrons corresponding to received light. The generated photoelectrons may be accumulated at the first sensing node SN1. During the reset period, a reverse bias may be applied to the light receiving element OPD. When the reset period becomes relatively long (e.g., greater than a predetermined time), the reverse bias may be applied to the light receiving element OPD for an extended period of time. As a result, significant stress may be applied to the light receiving element OPD. On the other hand, when the reset period becomes relatively short (e.g., less than a predetermined time), the first sensing node SN1 may not be stably reset. In this case, the sensing performance of the sensors FX may be degraded.

As illustrated in FIGS. 6 and 7, because the reset period starts after the input attempt time point t1, a problem in which the reset period becomes unnecessarily long may be improved. Furthermore, as illustrated in FIG. 8, the reset period is prevented from ending before the minimum time Tr elapses, and the first sensing node SN1 may be stably reset as the reset period is sufficiently ensured. In this case, the minimum time Tr may be a time sufficient to ensure stable reset of the first sending node SN1. Thus, the amount of stress applied to the light receiving element OPD may be reduced, while at the same time ensuring stable reset of the first sensing node SN1.

Figure 10:
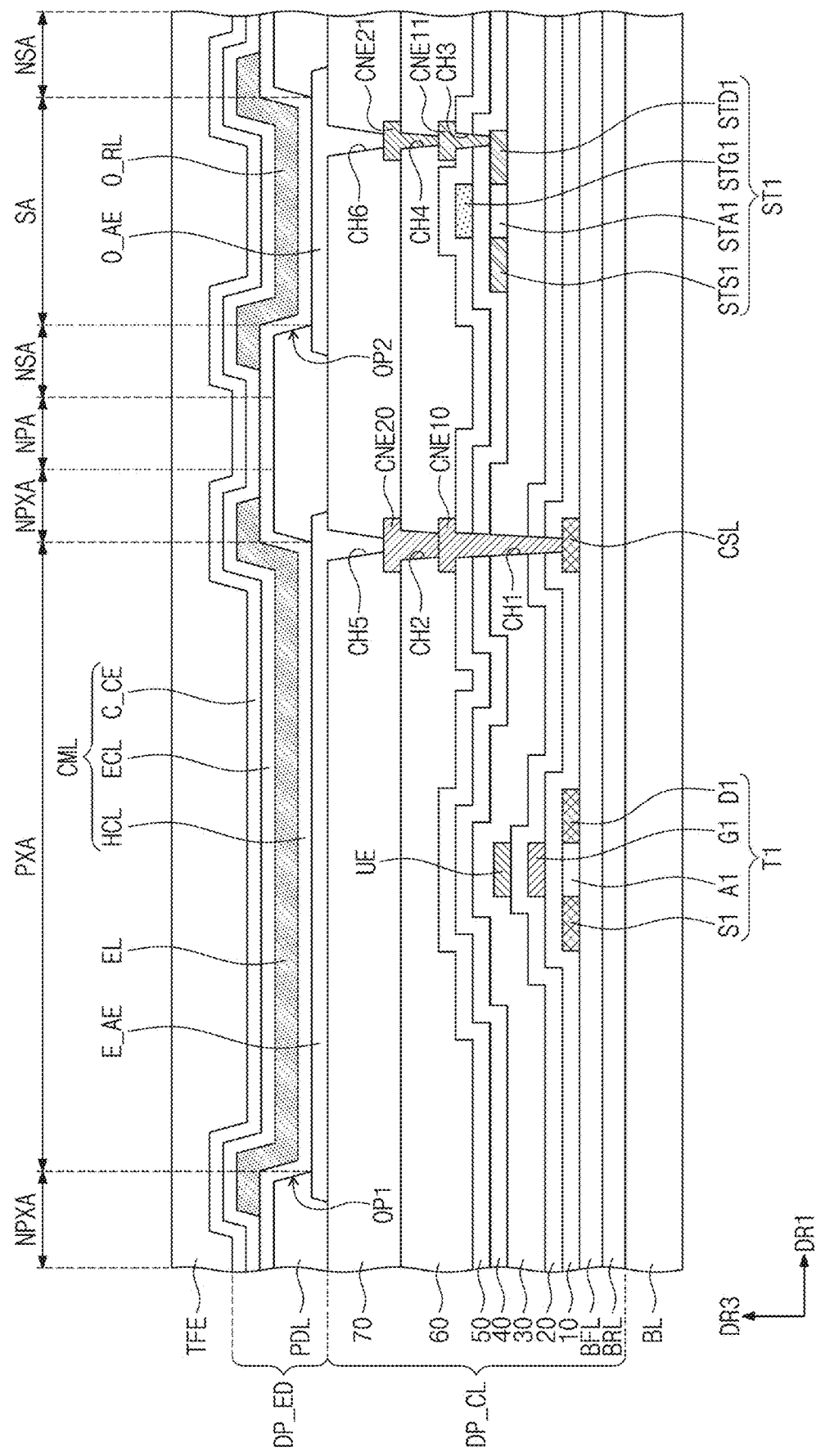
FIG. 10 is a cross-sectional view of a display panel according to an embodiment of the present disclosure.

FIG. 10 is a cross-sectional view illustrating a pixel and a sensor of a display panel according to an embodiment of the present disclosure.

Referring to FIG. 10, a display panel DP may include a base layer BL, a circuit layer DP_CL, and a device layer DP_ED. The base layer BL may include a synthetic resin layer. The synthetic resin layer may include a thermosetting resin. For example, the synthetic resin layer may be a polyimide-based resin layer, and the material thereof is not specifically limited. The synthetic resin layer may include at least one of acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin. In addition, the base layer BL may include a glass substrate, a metal substrate, an organic/inorganic composite substrate, or another type of substrate.

At least one inorganic layer may be formed on an upper surface of the base layer BL. The inorganic layer may include at least one of aluminum oxide, titanium oxide, silicon oxide, silicon oxynitride, zirconium oxide, or hafnium oxide. The inorganic layer may be formed of multiple layers. The multiple inorganic layers may make up a barrier layer BRL and/or a buffer layer BFL, which will be described below. The barrier layer BRL and the buffer layer BFL may be selectively arranged at predetermined positions.

The circuit layer DP_CL may include a barrier layer BRL and/or a buffer layer BFL. The barrier layer BRL may prevent foreign substances from being introduced from the outside. In one embodiment, the barrier layer BRL may include a silicon oxide layer and a silicon nitride layer. In one embodiment, a plurality of silicon oxide layers and/or a plurality of silicon nitride layers may be provided. In this case, the silicon oxide layers and the silicon nitride layers may be alternately laminated.

The buffer layer BFL may be disposed on the barrier layer BRL. The buffer layer BFL may improve a bonding force between the base layer BL and a semiconductor pattern and/or a conductive pattern. For example, the buffer layer BFL may include a silicon oxide layer and a silicon nitride layer. The silicon oxide layer and the silicon nitride layer may be alternately laminated. The buffer layer may be made of a different material in another embodiment.

The semiconductor pattern may be disposed on the buffer layer BFL. Hereinafter, a semiconductor pattern directly disposed on the buffer layer BFL may be defined as a first semiconductor pattern. The first semiconductor pattern may include a silicon semiconductor material. For example, the first semiconductor pattern may include polysilicon. However, the present disclosure is not limited thereto. The first semiconductor pattern may include amorphous silicon or another type of material.

FIG. 10 illustrates only a portion of the first semiconductor pattern. In one embodiment, the first semiconductor pattern may be further disposed in another area of a pixel PX (e.g., refer to FIG. 3). Electrical properties of the first semiconductor pattern may vary depending on whether it is doped. The first semiconductor pattern may include a doped area and an undoped area. The doped area may be doped with an N-type dopant or a P-type dopant. A P-type transistor may include a doped area doped with the P-type dopant, and an N-type transistor may include a doped area doped with the N-type dopant.

The doped area may have higher conductivity than the undoped area, and may substantially serve as an electrode or a signal line. The undoped area may correspond substantially to the active (or channel) of a transistor. For example, a portion of the first semiconductor pattern may be the active portion of the transistor, another portion thereof may be a source or drain of the transistor, and the other thereof may be a connection signal line (or connection electrode).

As illustrated in FIG. 10, a first electrode S1, a channel part A1, and a second electrode D1 of the first transistor T1 may be formed from the first semiconductor pattern. The first electrode S1 and the second electrode D1 of the first transistor T1 may extend in opposite directions from the channel part A1.

FIG. 10 illustrates a portion of a connection signal line CSL formed from the semiconductor pattern. In one embodiment, the connection signal line CSL may be connected with a second electrode of a second light emitting control transistor ET2 (e.g., refer to FIG. 9A) on a plane.

A first insulating layer 10 may be disposed on the buffer layer BFL. The first insulating layer 10 may overlap the plurality of pixels PX in common and may cover the first semiconductor pattern. The first insulating layer 10 may be an inorganic layer and/or an organic layer and may have a single- or multi-layered structure. The first insulating layer 10 may include at least one of an aluminum oxide, a titanium oxide, a silicon oxide, a silicon oxynitride, a zirconium oxide, or a hafnium oxide. In an embodiment, the first insulating layer 10 may be a single silicon oxide layer. In addition to the first insulating layer 10, an insulating layer of a circuit layer DP_CL (to be described below) may be an inorganic layer and/or an organic layer and may have a single- or multi-layered structure. The inorganic layer may include at least one of the materials described above.

A third (gate) electrode G1 of the first transistor T1 may be disposed on the first insulating layer 10. The third electrode G1 may be a portion of a metal pattern. The third electrode G1 of the first transistor T1 may overlap the channel part A1 of the first transistor T1. In the process of doping the first semiconductor pattern, the third electrode G1 of the first transistor T1 may serve as a mask.

A second insulating layer 20 may cover the third electrode G1 and may be disposed on the first insulating layer 10. The second insulating layer 20 may commonly overlap the plurality of pixels PX. The second insulating layer 20 may be an inorganic layer and/or an organic layer and may have a single-layered structure or a multi-layered structure. In an embodiment, the second insulating layer 20 may be a single silicon oxide layer.

An upper electrode UE may be disposed on the second insulating layer 20. The upper electrode UE may overlap the third (gate) electrode G1. The upper electrode UE may be a portion of a metal pattern or a portion of a doped semiconductor pattern. A portion of the third electrode G1 and the upper electrode UE overlapping the portion of the third electrode G1 may define a pixel capacitor Cst (e.g., refer to FIG. 9A). In an embodiment of the present disclosure, the upper electrode UE may be omitted.

In an embodiment of the present disclosure, the second insulating layer 20 may be replaced with an insulating pattern. The upper electrode UE may be disposed on the insulating pattern. The upper electrode UE may serve as a mask for forming an insulating pattern from the second insulating layer 20.

A third insulating layer 30 covering the upper electrode UE may be disposed on the second insulating layer 20. In an embodiment, the third insulating layer 30 may be a single silicon oxide layer. A semiconductor pattern may be disposed on the third insulating layer 30. Hereinafter, the semiconductor pattern directly disposed on the third insulating layer 30 may be a second semiconductor pattern. The second semiconductor pattern may include a metal oxide. The oxide semiconductor may include a crystalline or amorphous oxide semiconductor. For example, the oxide semiconductor may include one or more oxides of metals, including but not limited to zinc (Zn), indium (In), gallium (Ga), tin (Sn), and titanium (Ti), or metals, such as zinc (Zn), indium (In), gallium (Ga), tin (Sn), and titanium (Ti), or a mixture of oxides thereof. The oxide semiconductor may include, for example, indium-tin oxide (ITO), indium-gallium-zinc oxide (IGZO), zinc oxide (ZnO), indium-zinc oxide (IZO), zinc-indium oxide (ZIO), indium oxide (InO), titanium oxide (TiO), indium-zinc-tin oxide (IZTO), zinc-tin oxide (ZTO), and the like.

FIG. 10 illustrates only a portion of the second semiconductor pattern, and the second semiconductor pattern may be further disposed in another area of the pixel PX. The second semiconductor pattern may include a plurality of areas which are distinguished depending on whether the metal oxide is reduced. An area (hereinafter referred to as a "reduction area") in which the metal oxide is reduced may have higher conductivity than an area (hereinafter referred to as a "non-reduction area") in which the metal oxide is not reduced. The reduction area may substantially serve as an electrode or a signal line. The non-reduction area may correspond substantially to a channel part of a transistor. For example, the portion of the second semiconductor pattern may be a channel part of the transistor, and another portion thereof may be a first electrode or a second electrode of the transistor.

The circuit layer DP_CL may further include a portion of the semiconductor pattern of the sensor driving circuit O_SD (e.g., refer to FIG. 9A). For convenience of description, the reset transistor ST1 in the semiconductor pattern of the sensor driving circuit O_SD is illustrated. A first electrode STS1, a channel part STA1, and a second electrode STD1 of the reset transistor ST1 may be formed from the second semiconductor pattern. As an example of the present disclosure, the second semiconductor pattern may include metallic oxide. The first electrode STS1 and the second electrode STD1 may include metal reduced from a metal oxide semiconductor. The first electrode STS1 and the second electrode STD1 may have a predetermined thickness from an upper surface of the second semiconductor pattern and may include a metal layer including the reduced metal.

The fourth insulating layer 40 may be disposed to cover the first electrode STS1, the channel part STA1, and the second electrode STD1 of the first reset transistor ST1. A third (gate) electrode STG1 of the reset transistor ST1 may be disposed on the fourth insulating layer 40. In an embodiment, the third electrode STG1 may be a portion of a metal pattern. The third electrode STG1 of the reset transistor ST1 may overlap the channel part STA1 of the first reset transistor ST1. In an embodiment, for convenience of description, one third electrode STG1 is illustrated, but the first reset transistor ST1 may include two third electrodes.

A fifth insulating layer 50 may cover the third electrode STG1 and may be disposed on the fourth insulating layer 40. In an embodiment, the fifth insulating layer 50 may include a silicon oxide layer and a silicon nitride layer. The fifth insulating layer 50 may include a plurality of silicon oxide layers and a plurality of silicon nitride layers, which are alternately laminated.

At least one insulating layer may be further disposed on the fifth insulating layer 50. In an embodiment, a sixth insulating layer 60 and a seventh insulating layer 70 may be disposed on the fifth insulating layer 50. The sixth insulating layer 60 and the seventh insulating layer 70 may be organic layers and may have a single- or multi-layered structure. Each of the sixth insulating layer 60 and the seventh insulating layer 70 may, for example, be a single polyimide-based resin layer. However, the present disclosure is not limited thereto. The sixth insulating layer 60 and the seventh insulating layer 70 may include at least one of acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin.

A first connection electrode CNE10 may be disposed on the fifth insulating layer 50. The first connection electrode CNE10 may be connected with the connection signal line CSL through a first contact hole CH1 penetrating the first to fifth insulating layers 10 to 50, and a second connection electrode CNE20 may be connected with the first connection electrode CNE10 through a second contact hole CH2 penetrating the sixth insulating layer 60. In an embodiment of the present disclosure, at least one of the fifth to seventh insulating layers 50 to 70 may be omitted, and one of the first or second connection electrodes CNE10 and CNE20 may also be omitted.

A third connection electrode CNE11 may be further disposed on the fifth insulating layer 50. The third connection electrode CNE11 may be connected with the second electrode STD1 of the reset transistor ST1 through a third contact hole CH3, which penetrates the fourth and fifth insulating layers 40 to 50. A fourth connection electrode CNE21 may be connected with the third connection electrode CNE11 through a fourth contact hole CH4 penetrating the sixth insulating layer 60.

The element layer DP_ED may be disposed on the circuit layer DP_CL. The element layer DP_ED may include an anode electrode E_AE of the light emitting element ED (e.g., refer to FIG. 9A) and a sensing anode electrode O_AE of the light receiving element OPD (e.g., refer to FIG. 9A). As illustrated in FIG. 10, the anode electrode E_AE may be connected with the second connection electrode CNE20 through a fifth contact hole CH5 penetrating the seventh insulating layer 70. The sensing anode electrode O_AE may be connected with the fourth connection electrode CNE21 through a sixth contact hole CH6 penetrating the seventh insulating layer 70.

The device layer DP_ED may further include a pixel definition layer PDL disposed on the circuit layer DP_CL. The pixel definition layer PDL may include a light emitting opening OP1 corresponding to the light emitting element ED and a light receiving opening OP2 corresponding to the light receiving element OPD. The light emitting opening OP1 may expose at least a portion of the anode electrode E_AE of the light emitting element ED. The light emitting opening OP1 of the pixel definition layer PDL may define a light emitting area PXA. For example, a plurality of pixels PX (e.g., refer to FIG. 3) may be arranged in a certain rule on a plane of a display panel DP (e.g., refer to FIG. 3). An area where the plurality of pixels PX are arranged may be defined as a pixel area. One pixel area may include a light emitting area PXA and a non-light emitting area NPXA adjacent to the light emitting area PXA. The non-light emitting area NPXA may partially or completely surround the light emitting area PXA.

The light receiving opening OP2 may expose the sensing anode electrode O_AE of the light receiving element OPD. The light receiving opening OP2 of the pixel definition layer PDL may define a light receiving area SA. For example, a plurality of sensors FX (e.g., refer to FIG. 3) may be arranged in a certain rule on a plane of the display panel DP. An area in which the plurality of PX are arranged may serve as a sensing area. One sensing area may include a light receiving area SA and a non-light receiving area NSA adjacent to the light receiving area SA. The non-light receiving area NSA may partially or entirely surround the light receiving area SA.

A common layer CML may be disposed on the pixel definition layer PDL. In other words, the common layer CML may be commonly formed on the plurality of pixels PX (e.g., refer to FIG. 3) and the plurality of sensors FX (e.g., refer to FIG. 3). The common layer CML may include a common cathode electrode C_CE, a hole control layer HCL, and an electronic control layer ECL. The common cathode electrode C_CE may be commonly connected with the light emitting element ED and the light receiving element OPD. The common cathode electrode C_CE may face the sensing anode electrode O_AE and the anode electrode E_AE. The hole control layer HCL and the electronic control layer ECL may be arranged between the pixel definition layer PDL and the common cathode electrode C_CE. The hole control layer HCL may include a hole transport layer and a hole injection layer. The electronic control layer ECL may include an electronic transport layer and an electronic injection layer.

A light emitting layer EL may be disposed in the light emitting opening OP1 in the pixel definition layer PDL, and a photoelectric conversion layer O_RL may be provided in the light receiving opening OP2 in the pixel definition layer PDL. In an embodiment, the patterned light emitting layer EL is illustrated as an example, but the present disclosure is not limited thereto. A common light emitting layer may be commonly disposed in the plurality of pixels PX. At this time, the common light emitting layer may generate a predetermined color of light, e.g., white light, blue light, or another color of light. The light emitting layer EL and the photoelectric conversion layer O_RL may be arranged on the hole control layer HCL. The electronic control layer ECL may be disposed on the light emitting layer EL and the photoelectric conversion layer O_RL. The common cathode electrode C_CE may be disposed on the electronic control layer ECL. The hole control layer HCL, the electronic control layer ECL, and the common cathode electrode C_CE may be arranged in the plurality of pixels PX and the plurality of sensors FX in common.

Figure 11A:
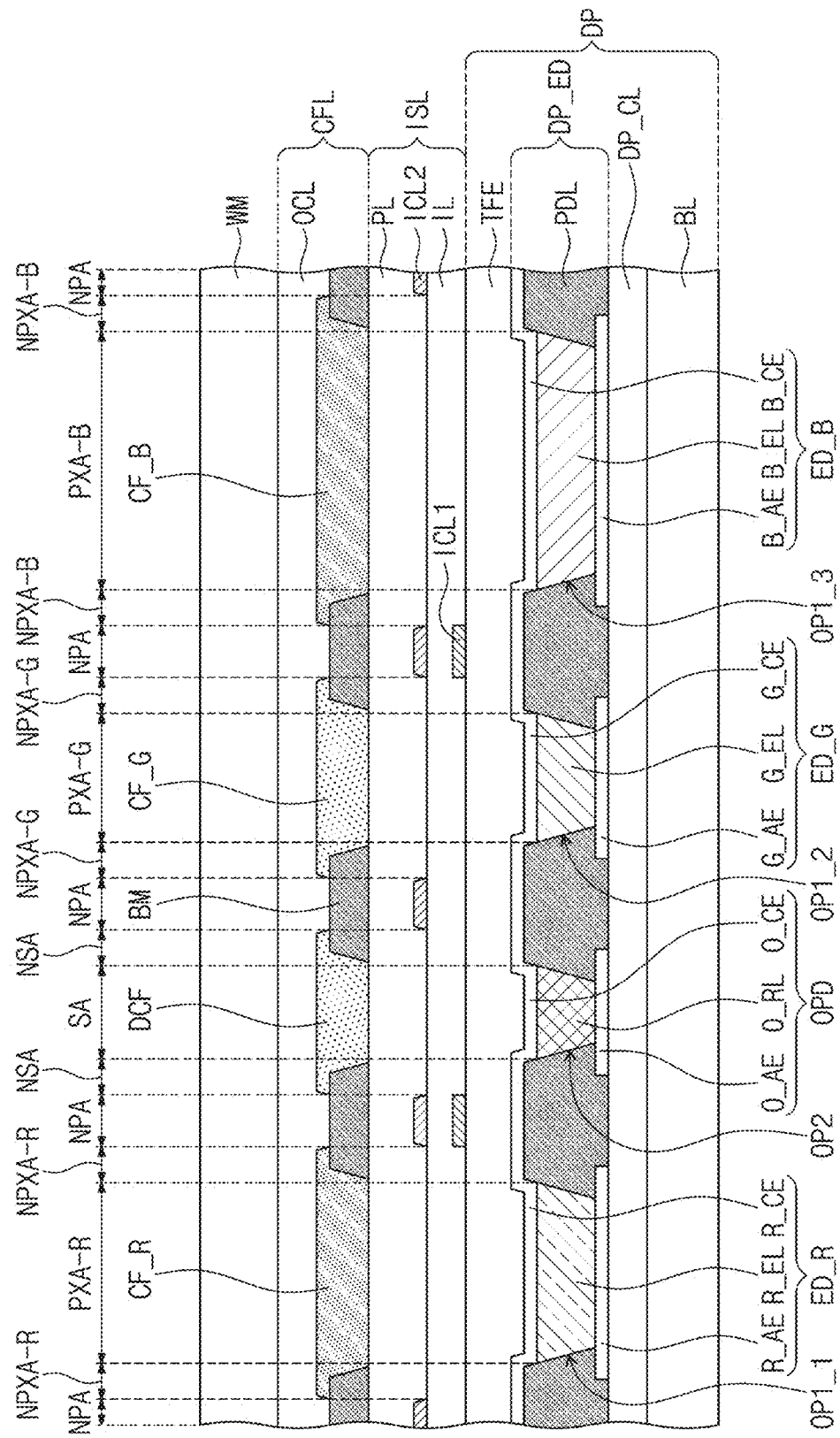
FIGS. 11A and 11B are cross-sectional views illustrating a display device according to an embodiment of the present disclosure.
Figure 11B:
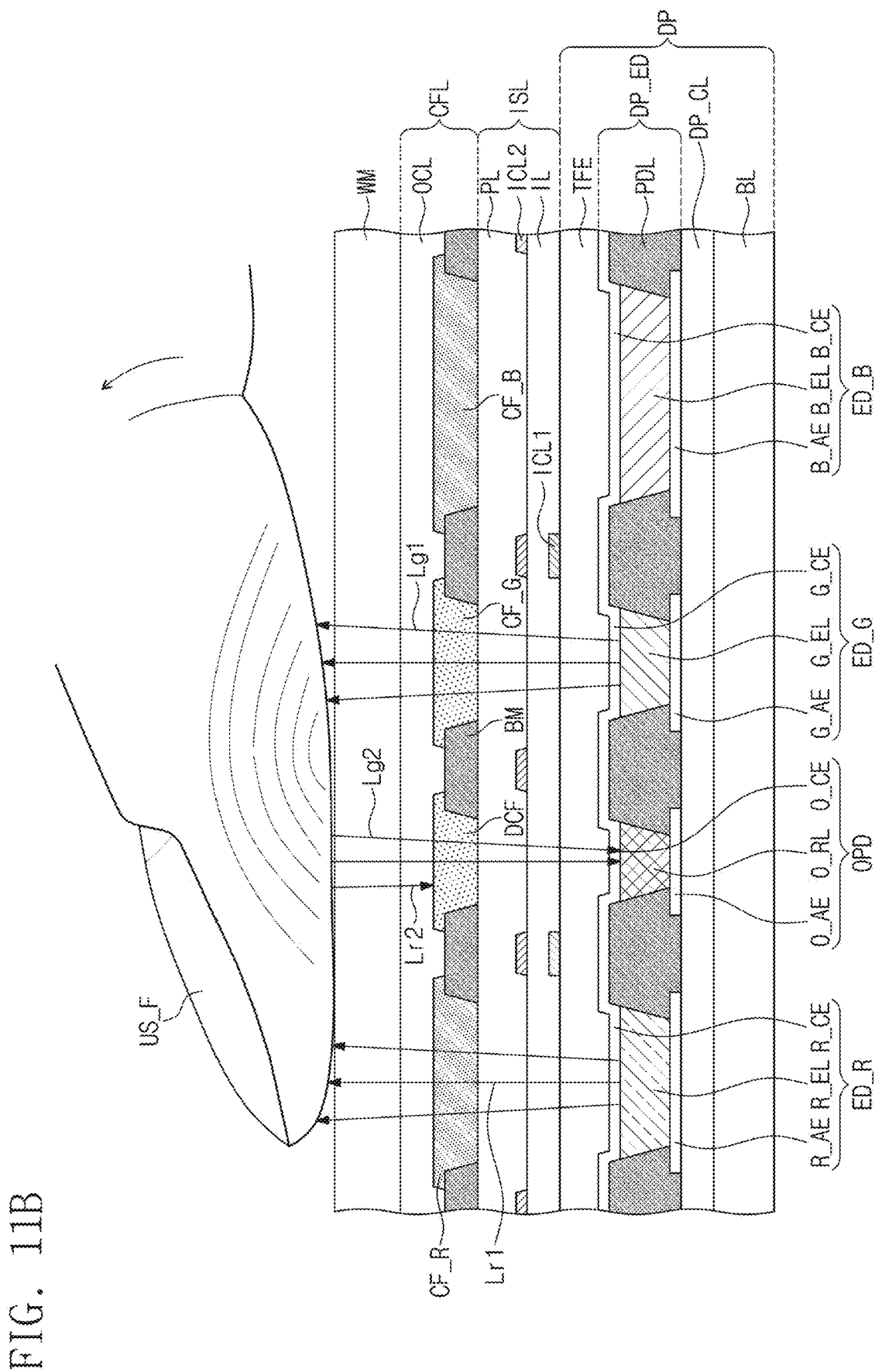

FIGS. 11A and 11B are cross-sectional views illustrating a display device according to an embodiment of the present disclosure.

Referring to FIGS. 11A and 11B, a first electrode layer may be disposed on a circuit layer DP_CL. A pixel definition layer PDL may be formed on the first electrode layer. The first electrode layer may include color (e.g., red, green, and blue) anodes R_AE, G_AE, and B_AE. First to third light emitting openings OP1_1, OP1_2, and OP1_3 of the pixel definition layer PDL may expose at least portions of the red, green, and blue anodes R_AE, G_AE, and B_AE, respectively. In an embodiment of the present disclosure, the pixel definition layer PDL may further include a black material. The pixel defining layer PDL may further include a black organic dye/pigment such as carbon black or aniline black. The pixel definition layer PDL may be formed, for example, by mixing a blue organic material and a black organic material. In one embodiment, the pixel definition layer PDL may further include a lyophobic organic matter.

As illustrated in FIG. 11A, a display panel DP may include first to third light emitting areas PXA-R, PXA-G, and PXA-B and first to third non-light emitting areas NPXA-R, NPXA-G, and NPXA-B adjacent to the first to third light emitting areas PXA-R, PXA-G, and PXA-B. Each of the non-light emitting areas NPXA-R, NPXA-G, and NPXA-B may surround a corresponding one of the light emitting areas PXA-R, PXA-G, or PXA-B. In an embodiment, the first light emitting area PXA-R may correspond to a portion of a red anode electrode R_AE exposed by the first light emitting opening OP1_1. The second light emitting area PXA-G may correspond to a portion of a green anode electrode G_AE exposed by the second light emitting opening OP1_2. The third light emitting area PXA-B may correspond to a portion of a blue anode electrode B_AE exposed by the third light emitting opening OP1_3. A non-pixel area NPA may be defined between the first to third non-light emitting areas NPXA-R, NPXA-G, and NPXA-B.

A light emitting layer may be disposed on the first electrode layer. The light emitting layer may include red, green, and blue light emitting layers R_EL, G_EL, and B_EL. The red, green, and blue light emitting layers R_EL, G_EL, and B_EL may be disposed in areas respectively corresponding to the first to third light emitting openings OP1_1, OP1_2, and OP1_3. The red, green, and blue light emitting layers R_EL, G_EL, and B_EL may be formed independently of each other. Each of the red, green, and blue light emitting layers R_EL, G_EL, and B_EL may include an organic material and/or an inorganic material. The red, green, and blue light emitting layers R_EL, G_EL, and B_EL may generate predetermined colors of light. For example, the red light emitting layer R_EL may generate a red light, the green light emitting layer G_EL may generate a green light, and the blue light emitting layer B_EL may generate a blue light.

The red, green, and blue light emitting layers R_EL, G_EL, and B_EL, which are patterned, are illustrated as an example in an embodiment, but one light emitting layer may be commonly disposed in the first to third light emitting areas PXA-R, PXA-G, and PXA-B. At this time, the light emitting layer may generate, for example, white light or blue light. Furthermore, the light emitting layer may have a multi-layered structure, e.g., a tandem structure.

Each of the red, green, and blue light emitting layers R_EL, G_EL, and B_EL may include a low molecular weight organic matter or a high molecular weight organic matter as a light emitting material. In one embodiment, each of the red, green, and blue light emitting layers R_EL, G_EL, and B_EL may include a quantum dot material as a light emitting material. The core of the quantum dot may be selected, for example, from a Group II-VI compound, a Group III-V compound, a Group IV-VI compound, a Group IV element, a Group IV compound, and a combination thereof.

A second electrode layer may be disposed on the red, green, and blue light emitting layers R_EL, G_EL, and B_EL. The second electrode layer may include red, green, and blue cathode electrode R_CE, G_CE, and B_CE. The red, green, and blue cathode electrode R_CE, G_CE, and B_CE may be electrically connected with each other. As an example of the present disclosure, the red, green, and blue cathode electrode R_CE, G_CE, and B_CE may have an integrated shape with each other. In this case, the red, green, and blue cathode electrode R_CE, G_CE, and B_CE may be arranged in the first to third light emitting areas PXA-R, PXA-G, and PXA-B, the first to third non-light emitting areas NPXA-R, NPXA-G, and NPXA-B, and the non-pixel area NPA in common.

The element layer DP_ED may further include a light receiving element OPD. The light receiving element OPD may be a photodiode. The pixel definition layer PDL may further include a light receiving opening OP2 corresponding to the light receiving element OPD.

The light receiving element OPD may include a sensing anode electrode O_AE, a photoelectric conversion layer O_RL, and a sensing cathode electrode O_CE. The sensing anode electrode O_AE may be disposed on the same layer as the first electrode layer. For example, the sensing anode electrode O_AE may be disposed on the circuit layer DP_CL and may be formed at the same time through the same process as the red, green, and blue anode electrodes R_AE, G_AE, and B_AE.

The light receiving opening OP2 of the pixel definition layer PDL may expose at least a portion of the sensing anode electrode O_AE. The photoelectric conversion layer O_RL may be disposed on the sensing anode electrode O_AE exposed by the light receiving opening OP2. The photoelectric conversion layer O_RL may include an organic photo sensing material. The sensing cathode electrode O_CE may be disposed on the photoelectric conversion layer O_RL. The sensing cathode electrode O_CE may be formed at the same time through the same process as the red, green, and blue cathode electrodes R_CE, G_CE, and B_CE. As an example of the present disclosure, the sensing cathode electrode O_CE may have an integrated shape with the red, green, and blue cathode electrodes R_CE, G_CE, and B_CE to form a common cathode electrode C-CE (e.g., refer to FIG. 10).

An encapsulation layer TFE may be disposed on the element layer DP_ED. The encapsulation layer TFE may include at least one of an inorganic layer or an organic layer. In an embodiment of the present disclosure, the encapsulation layer TFE may include two inorganic layers and an organic layer disposed therebetween. In an embodiment of the present disclosure, a thin film encapsulation layer may include a plurality of inorganic layers and a plurality of organic layers, which are alternately laminated.

The encapsulation inorganic layer may protect red, green, and blue light emitting elements ED_R, ED_G, and ED_B and the light emitting element OPD from moisture/oxygen. The encapsulation organic layer may protect the red, green, and blue light emitting elements ED_R, ED_G, and ED_B and the light emitting element OPD from foreign substances such as dust particles. The encapsulation inorganic layer may include, but is not particularly limited to, a silicon nitride layer, a silicon oxynitride layer, a silicon oxide layer, a titanium oxide layer, an aluminum oxide layer, or the like. The encapsulation organic layer may include, but is not particularly limited to, an acrylic-based organic layer.

The display device DD may include an input sensing layer ISL disposed on the display panel DP and a color filter layer CFL disposed on the input sensing layer ISL.

The input sensing layer ISL may be directly disposed on the encapsulation layer TFE. The input sensing layer ISL may include a first conductive layer ICL1, an insulating layer IL, a second conductive layer ICL2, and a protective layer PL. The first conductive layer ICL1 may be disposed on the encapsulation layer TFE. FIGS. 11A and 11B illustrate a structure in which the first conductive layer ICL1 is directly disposed on the encapsulation layer TFE, but the present disclosure is not limited thereto. The input sensing layer ISL may further include a base insulating layer disposed between the first conductive layer ICL1 and the encapsulation layer TFE. In this case, the encapsulation layer TFE may be covered by the base insulating layer, and the first conductive layer ICL1 may be disposed on the base insulating layer. As an example of the present disclosure, the base insulating layer may include an inorganic insulating material.

The insulating layer IL may cover the first conductive layer ICL1. The second conductive layer ICL2 may be disposed on the insulating layer IL. FIGS. 11A and 11B illustrate the structure where the input sensing layer ISL includes the first and second conductive layers ICL1 and ICL2, but the present disclosure is not limited thereto. For example, the input sensing layer ISL may include only one of the first or second conductive layers ICL1 and ICL2.

The protective layer PL may be disposed on the second conductive layer ICL2. The protective layer PL may include an organic insulating material. The protective layer PL may protect the first and second conductive layers ICL1 and ICL2 from moisture/oxygen, and may protect the first and second conductive layers ICL1 and ICL2 from foreign substances.

The color filter layer CFL may be disposed on the input sensing layer ISL. For example, the color filter layer CFL may be directly disposed on the protective layer PL. The color filter layer CFL may include a first color filter CF_R, a second color filter CF_G, and a third color filter CF_B. The first color filter CF_R may have a first color, the second color filter CF_G may have a second color, and the third color filter CF_B may have a third color. As an example of the present disclosure, the first color may be a red color, the second color may be a green color, and the third color may be a blue color. The first, second, and third colors may be different colors in another embodiment.

The color filter layer CFL may further include a dummy color filter DCF. As an example of the present disclosure, when an area where the photoelectric conversion layer O_RL is disposed corresponds to a sensing area SA and the periphery of the sensing area SA corresponds to a non-sensing area NSA, the dummy color filter DCF may be disposed to correspond to the sensing area SA. The dummy color filter DCF may overlap the sensing area SA and the non-sensing area NSA. As an example of the present disclosure, the dummy color filter DCF may have the same color as one of the first, second, or third color filters CF_R, CF_G, and CF_B. As an example of the present disclosure, the dummy color filter DCF may have the green color that is the same as the second color filter CF_G.

The color filter layer CFL may further include a black matrix BM. The black matrix BM may be disposed to correspond to the non-pixel area NPA. The black matrix BM may be disposed to overlap the first and second conductive layers ICL1 and ICL2 in the non-pixel area NPA. As an example of the present disclosure, the black matrix BM may overlap the non-pixel area NPA and the first, second, and third non-light emitting areas NPXA-R, NPXA-G, and NPXA-B. The black matrix BM may not overlap the first, second, and third light emitting areas PXA-R, PXR-G, and PXA-B.

The color filter layer CFL may further include an over-coating layer OCL. The over-coating layer OCL may include an organic insulating material. The over-coating layer OCL may be provided to have a thickness to such an extent as to remove a step difference between the first, second, and third color filters CF_R, CF_G, and CF_B. The over-coating layer OCL may include, but is particularly limited to, a material capable of planarizing an upper surface of the color filter layer CFL with a certain thickness and may include, for example, an acrylate-based organic material.

Referring to FIG. 11B, when a display device DD (e.g., refer to FIG. 1) operates, each of the red, green, and blue light emitting elements ED_R, ED_G, and ED_B may output light. The red light emitting elements ED_R may output a red light in a red wavelength band, the green light emitting elements ED_G may output a green light in a green wavelength band, and the blue light emitting elements ED_B may output a blue light in a blue wavelength band.

As an example of the present disclosure, the light receiving element OPD may receive light from specific light emitting elements (e.g., the green light emitting elements ED_G) among the red, green, and blue light emitting elements ED_R, ED_G, and ED_B. For example, the light receiving element OPD may receive a green reflected light Lg2 in which a green light Lg1 output from the green light emitting elements ED_G is reflected from a fingerprint of the user. The green light Lg1 and the green reflected light Lg2 may be lights in a green wavelength band. The dummy color filter DCF may be disposed on an upper portion of the light receiving element OPD. The dummy color filter DCF may have a green color. Thus, the green reflected light Lg2 may be incident to the light receiving element OPD through the dummy color filter DCF.

Meanwhile, the red and blue lights output from the red and blue light emitting elements ED_R and ED_B may also be reflected by a hand (or finger) US_F of the user. For example, when light in which the red light Lr1 output from the red light emitting elements ED_R is reflected by the hand US_F of the user is defined as the red reflected light Lr2, the red reflected light Lr2 may be absorbed without passing through the dummy color filter DCF. Thus, because the red reflected light Lr2 does not pass through the dummy color filter DCF, it may not be incident to the light receiving element OPD Likewise, although the blue light is reflected by the hand US_F of the user, it may be absorbed by the dummy color filter DCF. Thus, only the green reflected light Lg2 may be provided to the light receiving element OPD.

Figure 12:
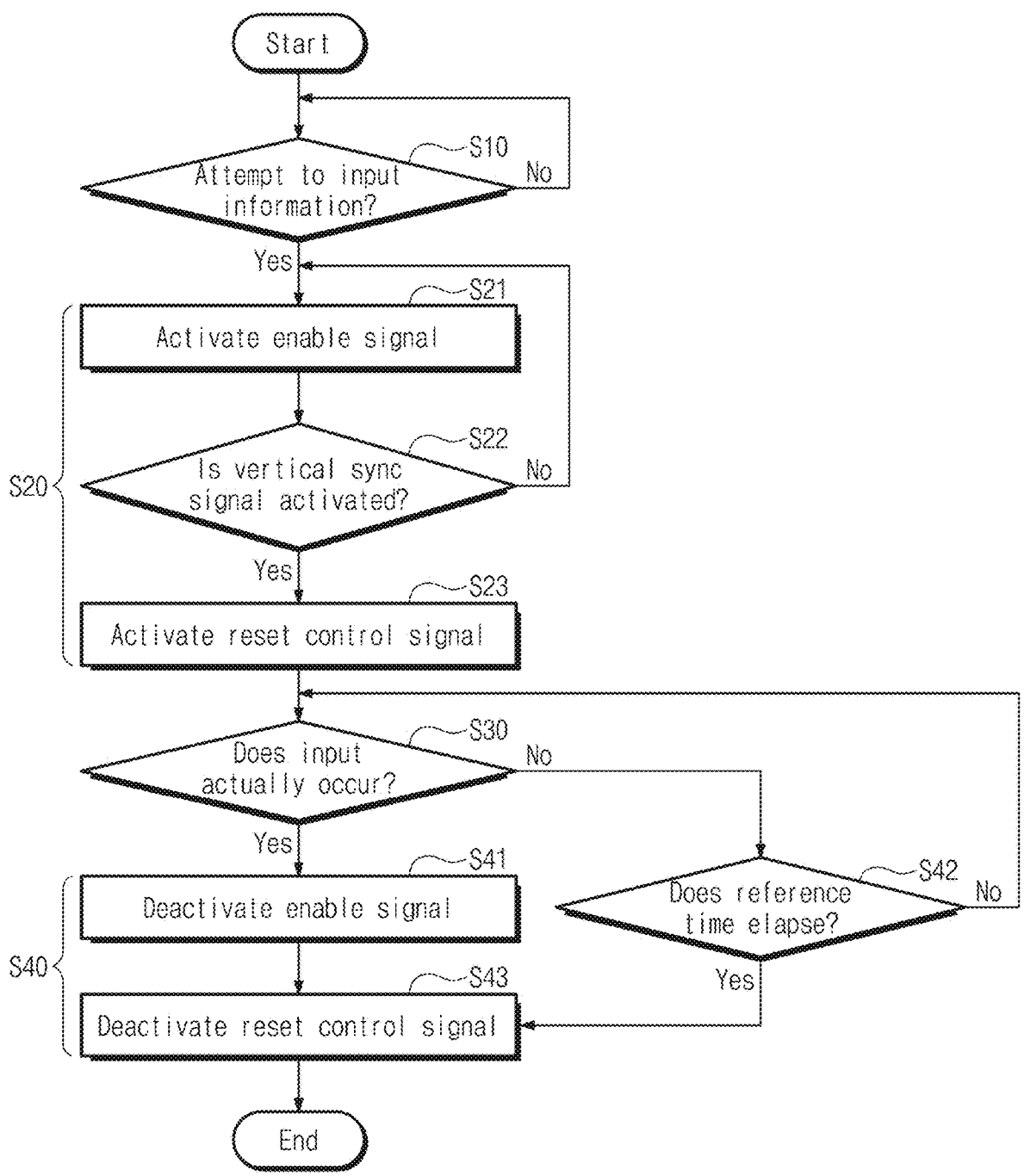
FIG. 12 is a flowchart illustrating a method for driving a display device according to an embodiment of the present disclosure.

FIG. 12 is a flowchart illustrating a method for driving a display device according to an embodiment of the present disclosure.

Referring to FIGS. 3, 4, and 12, the sensor controller 500 of the display device DD may first generate the reset control signal RST to drive the plurality of sensors FX. The plurality of sensors FX may be reset in response to the reset control signal RST during a reset period. Thereafter, the plurality of sensors FX may sense information of a user during a light receiving period. The plurality of sensors FX may output the sensed readout signals FS1 to FSh during an output period.

To generate the reset control signal, in operation S10, a driving controller 100 may determine whether the user attempts to input information by means of determination logic 110. In operation S20, the driving controller 100 may determine whether to activate the reset control signal depending on the determined result.

For example, when there is no attempt to input the information, the driving controller 100 may periodically move to operation S10 to perform again the operation of determining whether the user attempts to input information. When there is an attempt to input information, the driving controller 100 may activate the enable signal R_EN (e.g., refer to FIG. 6) at the input attempt time point (e.g., a first time point t1 in FIG. 6). As previously indicated, the input attempt time point may be based, for example, on initiation of an application AP, e.g., a point in time when the application is run. In this way, the application controls the reset period for the plurality of sensors FX.

Thereafter, in operation S22, a reset control circuit 510 may determine whether to activate the vertical sync signal Vsync (e.g., refer to FIG. 6). When the vertical sync signal Vsync is in an inactive period, the reset control signal RST may be maintained in an inactive state even though the enable signal R_EN is activated. Thereafter, when the vertical sync signal Vsync is activated, in operation S23, the reset control signal RST may be activated at an active time point, e.g., a rising time point of the vertical sync signal Vsync.

Thereafter, in operation S30, the driving controller 100 may determine whether the user actually inputs the information based on an output of the determination logic 110. In S40, the sensor controller 500 may determine whether to deactivate the reset control signal RST depending on the determined result. For example, when the input actually occurs, in operation S41, the sensor controller 500 may deactivate the enable signal R_EN at a time point (e.g., a second time point t2 in FIG. 6)) when the input occurs. Thereafter, in operation S43, the reset control signal RST may be deactivated in response to deactivation of the enable signal R_EN, for example, on occurrence of a rising edge of the next vertical sync signal Vsync.

In one embodiment, the method for driving the display device DD may further include determining whether to activate a vertical sync signal, before the reset control signal RST is deactivated. For example, when the vertical sync signal Vsync is in an inactive period, the reset control signal RST may be maintained in an active state even though the enable signal R_EN is deactivated. Thereafter, when the vertical sync signal Vsync is activated, the reset control signal RST may be deactivated at an active time point, e.g., a rising time point of a next vertical sync signal.

Meanwhile, when the input does not actually occur, the sensor controller 500 may determine whether a predetermined reference time has elapsed. When the reference time has not elapsed, the sensor controller 500 may move to the operation of determining whether an input has actually occurred. When the reference time has elapsed, in operation S42, the sensor controller 500 may deactivate the reset control signal RST at a first reference time point t1r (e.g., refer to FIG. 7).

Furthermore, when the input actually occurs before a predetermined minimum time Tr (e.g., refer to FIG. 8) elapses, the sensor controller 500 may maintain the reset control signal RST in the active state up to a second reference time point t2r (e.g., refer to FIG. 8) to ensure the reset period is sufficiently long to ensure that a stable reset has occurred.

In accordance with one or more of the aforementioned embodiments, and as illustrated, for example, in FIGS. 6 and 7, problems caused by significant stress being placed on light emitting element OPD may be overcome by preventing the reset period from being unnecessarily long. Furthermore, as illustrated in FIG. 8, the reset period may be prevented from ending too soon, which, in turn, may caused an unstable reset to be performed. This may be accomplished by preventing the reset period from ending before a minimum time Tr elapses set to ensure a stable result, e.g., to ensure that first sensing node SN1 is stably reset within the reset period.

For example, according to an embodiment of the present disclosure, a reset control signal may be activated after a time point when the user attempts to input information to initiate a reset period. Thus, a problem in which stress is applied to a light receiving element (because the reset period becomes unnecessarily long) may be solved. Furthermore, the reset period is prevented from ending before a minimum time elapses. This ensures stable reset of the sensors within the reset period, thus improving sensing performance.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, drivers, units, generators, logic, circuits, and other signal generating and signal processing features of the embodiments disclosed herein may be implemented, for example, in non-transitory logic that may include hardware, software, or both. When implemented at least partially in hardware, the controllers, processors, drivers, units, generators, logic, circuits, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, controllers, processors, drivers, units, generators, logic, circuits, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present disclosure has been described with reference to an embodiment thereof, it will be apparent to those of ordinary skill in the art that various changes and modifications may be made thereto without departing from the spirit and scope of the present disclosure as set forth in the following claims. Accordingly, the technical scope of the present disclosure should not be limited to the contents described in the detailed description of the specification, but should be defined by the claims. The embodiments may be combined to form additional embodiments.

The invention claimed is:

1. A display device, comprising:
a display panel including a plurality of pixels, each of which includes a light emitter to emit light to display an image and a plurality of sensors, each of the plurality of sensors including a light detector to detect user authentication information;
a sensor controller electrically connected with the plurality of sensors and configured to provide a reset control signal to the plurality of sensors; and
a driving controller configured to:
determine a first time point when an application is initiated that requires input of the user authentication information,
determine a second time point when the user touches the display panel to input the user authentication information,
activate an enable signal at the first time point and deactivate the enable signal at the second time point, and
provide the sensor controller with the enable signal and a vertical sync signal that determines an initiation point of the reset control signal,
wherein the reset control signal initiates reset of each of the plurality of sensors after the first time point based on the enable signal and the vertical sync signal.

2. The display device of claim 1, wherein the sensor controller includes:
a reset control circuit configured to generate the reset control signal in response to the enable signal; and a readout circuit configured to receive a readout signal from the plurality of sensors.

3. The display device of claim 2, wherein the driving controller includes:
determination logic configured to determine the first time point and the second time point; and
a signal generator configured to generate the enable signal activated at the first time point and deactivated at the second time point depending on the determined result.

4. The display device of claim 3, wherein the reset control circuit is configured to deactivate the reset control signal after a first reference time point when a predetermined reference time elapses, when the enable signal is activated after the first time point.

5. The display device of claim 3, wherein the reset control circuit is configured to:
maintain the reset control signal in an active state when the enable signal is deactivated at the second time point before a predetermined minimum time elapses after the first time point, and
deactivate the reset control signal after a second reference time point when the predetermined minimum time elapses.

6. The display device of claim 2, wherein the reset control circuit is configured to receive the vertical sync signal from the driving controller.

7. The display device of claim 1, wherein each of the plurality of sensors includes:
a sensor driving circuit connected with the light detector at a first sensing node, and wherein the sensor driving circuit includes:
a reset transistor including a first electrode configured to receive a reset voltage, a second electrode connected with the first sensing node, and a third electrode configured to receive the reset control signal.

8. The display device of claim 7, wherein the sensor driving circuit includes:
an amplification transistor including a first electrode configured to receive a sensor driving voltage, a second electrode connected with the first sensing node, and a third electrode connected with a second sensing node; and
an output transistor including a first electrode connected with the second sensing node, a second electrode connected with a readout line, and a third electrode to receive an output control signal.

9. The display device of claim 8, wherein:
each of the plurality of pixel includes a pixel driving circuit connected with the light emitter, and
the pixel driving circuit includes:
a first transistor connected between a first driving voltage line to receive a first driving voltage and the light emitter; and
a second transistor connected between a data line and a first electrode of the first transistor and configured to receive a first scan signal.

10. The display device of claim 9, wherein the pixel driving circuit includes:
a third transistor connected between a second electrode of the first transistor and a first node and configured to receive a second scan signal;
a fourth transistor connected between a first initialization line to which a first initialization voltage is applied and the first node and configured to receive a third scan signal; and
a fifth transistor connected between a second initialization line to which a second initialization voltage is applied and the light emitter and configured to receive a fourth scan signal.

11. The display device of claim 10, wherein the output transistor receives one of the first to fourth scan signals as the output control signal.

12. A method for driving a display device including a display panel including a plurality of pixels, each of which includes a light emitter to emit light to display an image, and a plurality of sensors, each of which includes a light detector to detect user authentication information, the method comprising:
generating a reset control signal before receiving input of the user authentication information;
resetting the plurality of sensors in response to the reset control signal;
sensing, by the plurality of sensors, the user authentication information; and
outputting a readout signal sensed by the plurality of sensors, wherein generating the reset control signal includes:
determining whether an application is initiated that requires input of the user authentication information;
activating an enable signal at a first time point when the application is initiated that requires input of the user authentication information;
activating the reset control signal in response to the enable signal and a vertical sync signal after the first time point;
determine a second time point when the user touches the display panel to input the user authentication information; and
determining whether to deactivate the reset control signal depending on whether the user authentication information is input,
wherein the reset control signal initiates reset of each of the plurality of sensors after the first time point and before the second time point.

13. The method of claim 12, wherein:
determining whether to activate the reset control signal includes determining whether a rising edge of the vertical sync signal has occurred, and
activating the reset control signal includes activating the reset control signal based on the enable signal and the rising edge of the vertical sync signal after the first time point.

14. The method of claim 12, wherein determining whether to deactivate the reset control signal includes:
deactivating the enable signal at the second time point when the user authentication information is input, the reset control signal to initiate reset of the plurality of sensors before the second time point; and
deactivating the reset control signal after the second time point in response to the enable signal.

15. The method of claim 12, wherein:
when input of the user authentication information is not yet detected, the enable signal is maintained in an active state after the first time point and the reset control signal is deactivated after a first reference time point when a predetermined reference time elapses.

16. The method of claim 14, wherein:
the reset control signal is maintained in an active state, when the enable signal is deactivated at the second time point before a predetermined minimum time elapses after the first time point, and
the reset control signal is deactivated after a second reference time point when the minimum time elapses.

17. The method of claim 12, wherein:
each of the plurality of sensors includes a sensor driving circuit connected with the light detector at a first sensing node, and
the sensor driving circuit includes a first electrode configured to receive a reset voltage, a second electrode connected with the first sensing node, and a third electrode configured to receive the reset control signal and resets the first sensing node using the reset voltage in response to the reset control signal during a reset period.

* * * * *